US012044873B2

(12) United States Patent  (10) Patent No.: US 12,044,873 B2
Takahashi et al.  (45) Date of Patent: Jul. 23, 2024

(54) BIREFRINGENCE FILM, MANUFACTURING METHOD FOR BIREFRINGENCE FILM, AND DISPLAY DEVICE

(71) Applicant: Shanghai Tianma Micro-Electronics Co., Ltd., Shanghai (CN)

(72) Inventors: Sounosuke Takahashi, Kanagawa (JP); Tetsushi Sato, Kanagawa (JP); Tetsurou Tashiro, Kanagawa (JP)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 56 days.

(21) Appl. No.: 17/723,550

(22) Filed: Apr. 19, 2022

(65) Prior Publication Data

US 2022/0342133 A1  Oct. 27, 2022

(30) Foreign Application Priority Data

Apr. 26, 2021 (JP) ................................ 2021-073966

(51) Int. Cl.
*G02B 5/30* (2006.01)
*G02F 1/1335* (2006.01)
*G02F 1/13363* (2006.01)

(52) U.S. Cl.
CPC ..... *G02B 5/3016* (2013.01); *G02F 1/133528* (2013.01); *G02F 1/13363* (2013.01); *G02F 2413/04* (2013.01); *G02F 2413/07* (2013.01)

(58) Field of Classification Search
CPC .......................... G02F 1/133633; G09G 3/007
See application file for complete search history.

(56) References Cited

U.S. PATENT DOCUMENTS

| | | | |
|---|---|---|---|
| 6,291,035 B1 * | 9/2001 | Verrall | G02F 1/133632 428/1.3 |
| 2006/0274229 A1 | 12/2006 | Ito et al. | |
| 2008/0273151 A1 * | 11/2008 | Kuo | G02F 1/133632 349/115 |

FOREIGN PATENT DOCUMENTS

| | | |
|---|---|---|
| JP | 2006-337676 A | 12/2006 |
| JP | 2007-199726 A | 8/2007 |
| JP | 2014052473 A * | 3/2014 |

* cited by examiner

*Primary Examiner* — Alexander P Gross
(74) *Attorney, Agent, or Firm* — Sughrue Mion, PLLC

(57) ABSTRACT

A birefringence film is provided with a plurality of birefringence layers including a hybrid-aligned liquid crystalline polymer. The plurality of birefringence layers is stacked in a state in which the alignment directions of the liquid crystal polymer are identical, and the rising directions of the tilt angle of the liquid crystal polymer are identical.

6 Claims, 27 Drawing Sheets

BIREFRINGENCE FILM, MANUFACTURING METHOD FOR BIREFRINGENCE FILM, AND DISPLAY DEVICE

CROSS-REFERENCE TO RELATED APPLICATION

This application claims the benefit of Japanese Patent Application No. 2021-73966, filed on Apr. 26, 2021, the entire disclosure of which is incorporated by reference herein.

FIELD

The present disclosure relates generally to a birefringence film, a manufacturing method for the birefringence film, and a display device.

BACKGROUND

In the related art, there are display devices that increase resolution by optically shifting the pixels of the display element. For example, Unexamined Japanese Patent Application Publication No. 2007-199726 describes an image display device including a display element having a display surface formed by arranging a plurality of pixels, image display control means that cause the display element to display different images in sequential fields, and vibration means that cause an optical axis of light emitted from the display surface to vibrate in a predetermined direction, in sync with switching of the image by the image display control means. The vibration means include a twisted nematic (TN) shutter and a birefringence plate.

With the image display device of Unexamined Japanese Patent Application Publication No. 2007-199726, the TN shutter changes the polarization direction of the light from the pixels, and allows the light from the pixels to pass through the birefringence plate as extraordinary light or ordinary light. Additionally, the birefringence plate shifts the exit position of the extraordinary light and the exit position of the ordinary light. When the light from the pixels passes through the birefringence plate as extraordinary light, the positions of the pixels are observed shifted half the pixel pitch from the original positions in the display element. However, when the light from the pixels passes through the birefringence plate as ordinary light, the positions of the pixels are observed at the original positions in the display element. This configuration increases the resolution of the image display device.

In Unexamined Japanese Patent Application Publication No. 2007-199726, quartz, lithium niobate, and the like are given as examples of the material of the birefringence plate. Quartz, lithium niobate, and the like have low refraction index anisotropy and, as such, the thickness of the birefringence plate (birefringence film) must be made extremely thick in order to shift the positions of the pixels half the pixel pitch.

SUMMARY

A birefringence film according to a first aspect of the present disclosure includes:
a plurality of birefringence layers including a hybrid-aligned liquid crystal polymer, wherein
the plurality of birefringence layers is stacked in a state in which alignment directions of the liquid crystal polymer are identical, and rising directions of a tilt angle of the liquid crystal polymer are identical.

A birefringence film according to a second aspect includes:
a third birefringence layer including a hybrid-aligned liquid crystal polymer, an alignment direction of the liquid crystal polymer being a predetermined first direction; and
a fourth birefringence layer including a hybrid-aligned liquid crystal polymer, an alignment direction of the liquid crystal polymer being a predetermined second direction that crosses the predetermined first direction at 90°, wherein
the third birefringence layer and the fourth birefringence layer are stacked.

A manufacturing method for a birefringence film according to a third aspect includes:
a first application step of applying a composition including a polymerizable liquid crystal compound on an alignment film, subjected to an alignment treatment, of a substrate;
a birefringence layer forming step of forming a birefringence layer including a hybrid-aligned liquid crystalline polymer by polymerizing the polymerizable liquid crystal compound to fix an alignment of the polymerizable liquid crystal compound;
a peeling step of peeling the birefringence layer from the substrate; and
a first stacking step of stacking the peeled birefringence layer in a state in which alignment directions of the liquid crystalline polymer are identical, and rising directions of a tilt angle of the liquid crystalline polymer are identical.

A manufacturing method for a birefringence film according to a fourth aspect includes:
a first application step of applying a composition including a polymerizable liquid crystal compound on an alignment film, subjected to an alignment treatment, of a substrate;
a birefringence layer forming step of forming a birefringence layer including a hybrid-aligned liquid crystalline polymer by polymerizing the polymerizable liquid crystal compound to fix an alignment of the polymerizable liquid crystal compound;
a peeling step of peeling the birefringence layer from the substrate; and
a second stacking step of stacking the peeled birefringence layer in a state in which an alignment direction of the liquid crystalline polymer is a predetermined first direction and in a state in which the alignment direction of the liquid crystalline polymer is a predetermined second direction that crosses the predetermined first direction at 90°.

A manufacturing method for a birefringence film according to a fifth aspect includes:
a first application step of applying a composition including a polymerizable liquid crystal compound on an alignment film, subjected to an alignment treatment, of a substrate;
a birefringence layer forming step of forming a birefringence layer including a hybrid-aligned liquid crystalline polymer by polymerizing the polymerizable liquid crystal compound to fix an alignment of the polymerizable liquid crystal compound;
a protection layer forming step of forming a protection layer on the birefringence layer;

an alignment film forming step of forming, on the protection layer, an alignment film subjected to alignment treatment in a direction identical to the alignment film of the substrate; and a second application step of applying the composition including the polymerizable liquid crystal compound on the alignment film formed on the protection layer, wherein the protection layer forming step, the alignment film forming step, the second application step, and the birefringence layer forming step are repeated.

A display device according to a sixth aspect includes:

the birefringence film described above;

a display panel including an arranged plurality of pixels, the birefringence film being disposed on a display surface side of the display panel; and a polarization switching element that is disposed between the display panel and the birefringence film, that switches light exiting from the display panel between first linearly polarized light, for which a polarization direction is a predetermined third direction, and second linearly polarized light, for which the polarization direction is orthogonal to the polarization direction of the first linearly polarized light, and emits the light on the birefringence film, wherein the polarization switching element emits one of the first linearly polarized light and the second linearly polarized light on the birefringence film as ordinary light and emits another of the first linearly polarized light and the second linearly polarized light on the birefringence film as extraordinary light.

It is to be understood that both the foregoing general description and the following detailed description are exemplary and explanatory and are not restrictive of this disclosure.

BRIEF DESCRIPTION OF THE DRAWINGS

A more complete understanding of this application can be obtained when the following detailed description is considered in conjunction with the following drawings, in which.

DETAILED DESCRIPTION

Hereinafter, a birefringence film and a display device according to various embodiments are described while referencing the drawings.

Embodiment 1

Figure 1:
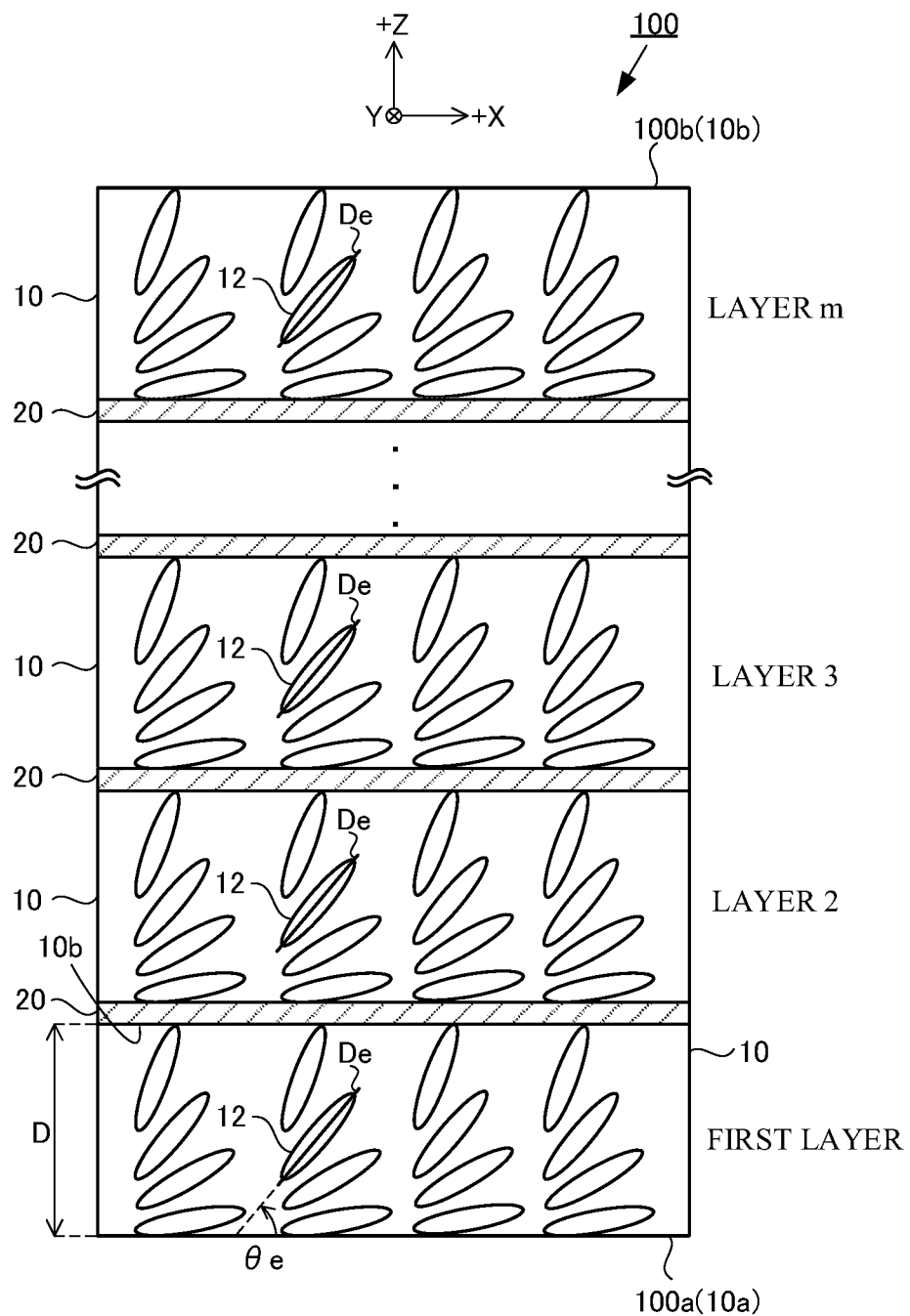
FIG. 1 is a schematic drawing illustrating a cross-section of a birefringence film according to Embodiment 1.

A birefringence film 100 according to the present embodiment is described while referencing FIGS. 1 to 7. As illustrated in FIG. 1, the birefringence film 100 includes a first main surface 100a which light enters, and a second main surface 100b on the side opposite the first main surface 100a. The light that enters from the first main surface 100a exits from the second main surface 100b. The birefringence film 100 includes a plurality of first birefringence layers 10, and an adhesive layer 20. The birefringence film 100 is formed by stacking the plurality of first birefringence layers 10 with the adhesive layer 20 disposed therebetween. As illustrated in FIG. 1, in the birefringence film 100 of the present embodiment, m layers of the first birefringence layer 10 are stacked (where m is a natural number of 2 or greater, for example m=40 to 400). In the present specification, to facilitate comprehension, a description is given in which, in FIG. 1, the right direction (the right direction on paper) of the birefringence film 100 is referred to as the "+X direction", the up direction (the up direction on paper) is referred to as the "+Z direction", and the direction perpendicular to the +X direction and the +Z direction (the depth direction on paper) is referred to as the "+Y direction." Additionally, the hatching of the birefringence layers is omitted in FIG. 1 to facilitate comprehension. Furthermore, the hatching of the birefringence layers is sometimes omitted in the following drawings as well to facilitate comprehension.

The first birefringence layer 10 includes a first main surface 10a which light enters, and a second main surface 10b on the side opposite the first main surface 10a. The light that enters from the first main surface 10a exits from the second main surface 10b. The first birefringence layer 10 is formed from a hybrid-aligned liquid crystalline polymer. In one example, a thickness D of the first birefringence layer 10 is from 0.5 μm to 3 μm.

In this case, the term "liquid crystalline polymer" refers to a polymer material (polymer) formed by aligning a polymerizable liquid crystal compound 12 (that is, a liquid crystalline compound including a polymerizable group) and, then, polymerizing the polymerizable liquid crystal compound 12. Additionally, the phrase "alignment direction of the liquid crystalline polymer" refers to a direction within the first main surface 10a of an image 14 obtained by projecting, on the first main surface 10a of the first birefringence layer 10, an extraordinary light axis De of the polymerizable liquid crystal compound 12 that is aligned and that is forming the liquid crystalline polymer. The phrase "tilt angle θe of the liquid crystalline polymer" refers to the slope, of the extraordinary light axis De of the polymerizable liquid crystal compound 12 that is aligned and that is forming the liquid crystalline polymer, with respect to the first main surface 10a of the first birefringence layer 10.

The term "hybrid-aligned" refers to an alignment in which the slope of the polymerizable liquid crystal compound 12 (that is, the tilt angle θe of the liquid crystalline polymer) with respect to the first main surface 10a of the first birefringence layer 10 continuously changes. Note that, in the present embodiment, an example is given in which the polymerizable liquid crystal compound 12 is described as a rod-like polymerizable liquid crystal compound that forms a nematic layer.

Figure 2:
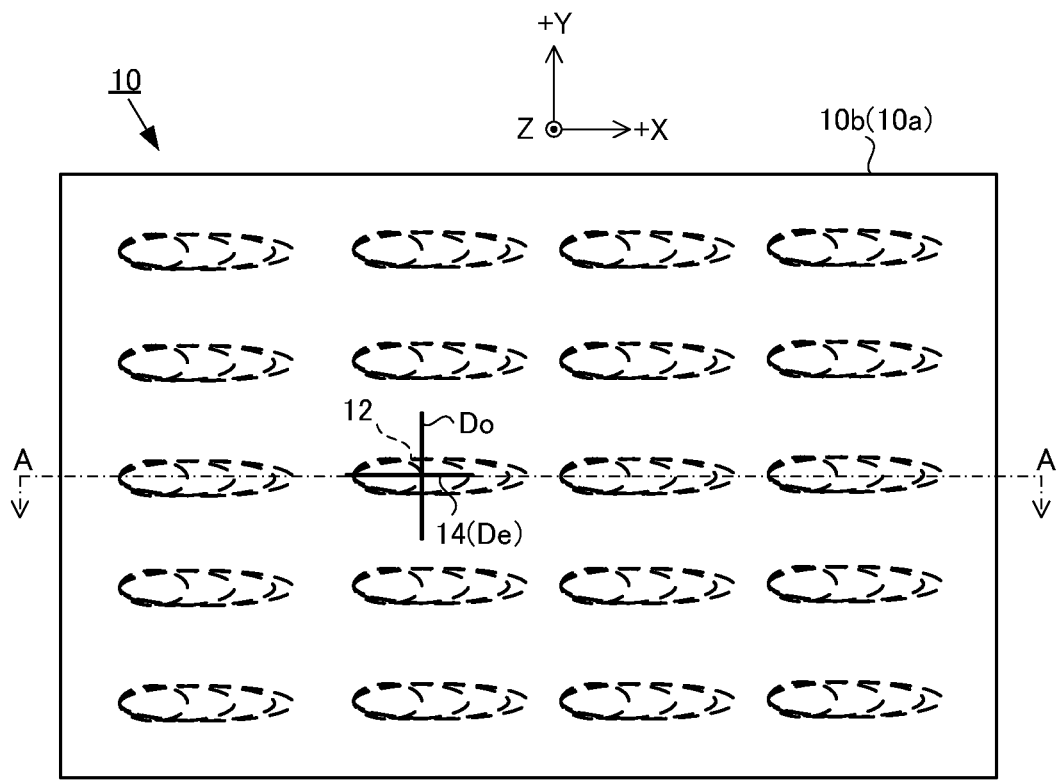
FIG. 2 is a schematic drawing of a first birefringence layer according to Embodiment 1, viewed from above.
Figure 3:
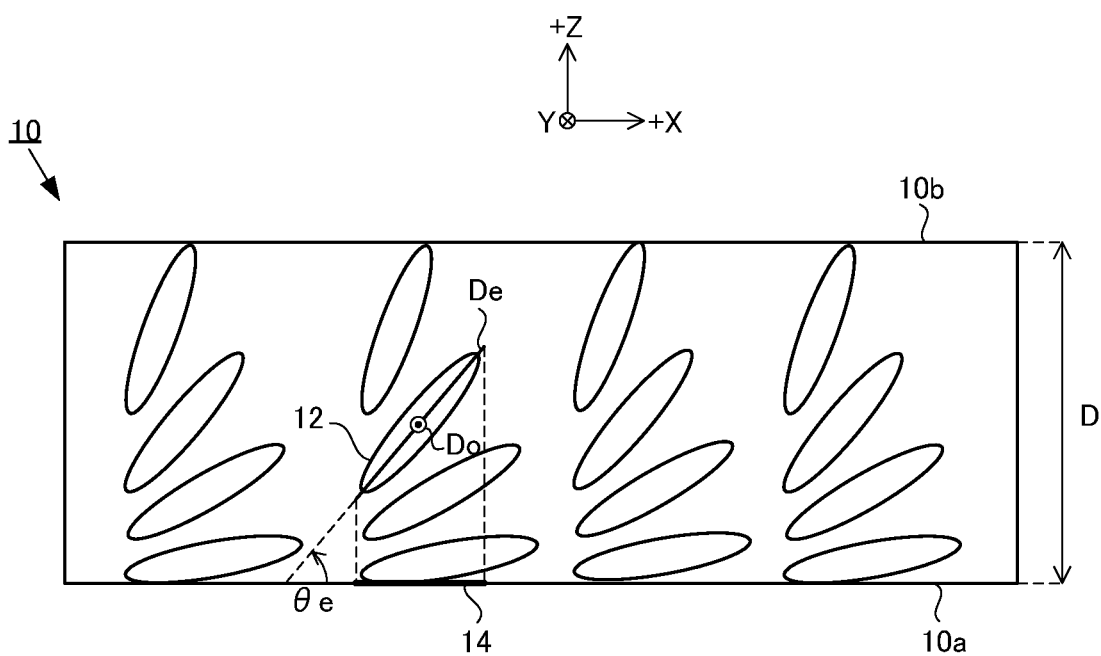
FIG. 3 is a cross-sectional view of the first birefringence layer illustrated in FIG. 2, taken along line A-A.

As illustrated in FIGS. 2 and 3, the liquid crystalline polymer of the first birefringence layer 10 is aligned in the X direction. Additionally, the tilt angle θe of the liquid crystalline polymer rises in the +Z direction with respect to the first main surface 10a (the +X direction), and continuously increases from the first main surface 10a toward the second main surface 10b. In one example, the tilt angle θe of the liquid crystalline polymer is from 2° to 70°. Note that an ordinary light axis Do of the polymerizable liquid crystal compound 12 is parallel to the Y direction.

As illustrated in FIG. 1, the birefringence film 100 is formed by stacking the first birefringence layers 10 in a state in which the alignment directions of the liquid crystalline polymer are identical and, also, the rising directions of the tilt angle θe of the liquid crystalline polymer are identical. Specifically, in the first birefringence layers 10 that are stacked and that form the birefringence film 100, the liquid crystalline polymer is aligned in the X direction and the tilt angle θe of the liquid crystalline polymer rises in the +Z direction with respect to the first main surface 10a (the +X direction). Additionally, in the present embodiment, the tilt angle θe of the liquid crystalline polymer increases continuously from the first main surface 10a of the first birefringence layer 10 toward the second main surface 10b of the first birefringence layer 10.

The adhesive layer 20 is positioned between the first birefringence layers 10 and adheres the second main surface 10b of one first birefringence layer 10 to the first main surface 10a of another first birefringence layer 10. The adhesive layer 20 is a thermosetting adhesive, an ultraviolet (UV) curable adhesive, or the like.

Next, the effects of the birefringence film 100 are described. In the first birefringence layer 10, the tilt angle θe of the liquid crystalline polymer (the extraordinary light axis De of the polymerizable liquid crystal compound) continuously changes with respect to the first main surface 10a (the +X direction) and, as such, the extraordinary light axis FDe of the first birefringence layer 10 illustrated in FIG. 4 as a whole can be regarded as being inclined an average value θ of the tilt angles θe of the liquid crystalline polymer with respect to the first main surface 10a (the +X direction). Meanwhile, the ordinary light axis of the first birefringence layer 10 as a whole is parallel to the first main surface 10a (the Y direction). Note that, in the following, the extraordinary light axis FDe of the first birefringence layer 10 as a whole is referred to as the extraordinary light axis FDe of the first birefringence layer 10. Additionally, the angle of the extraordinary light axis FDe of the first birefringence layer 10 with respect to the first main surface 10a (the +X direction) is referred to as θ. Furthermore, the ordinary light axis of the first birefringence layer 10 as a whole is referred to as the ordinary light axis of the first birefringence layer 10.

Figure 4:
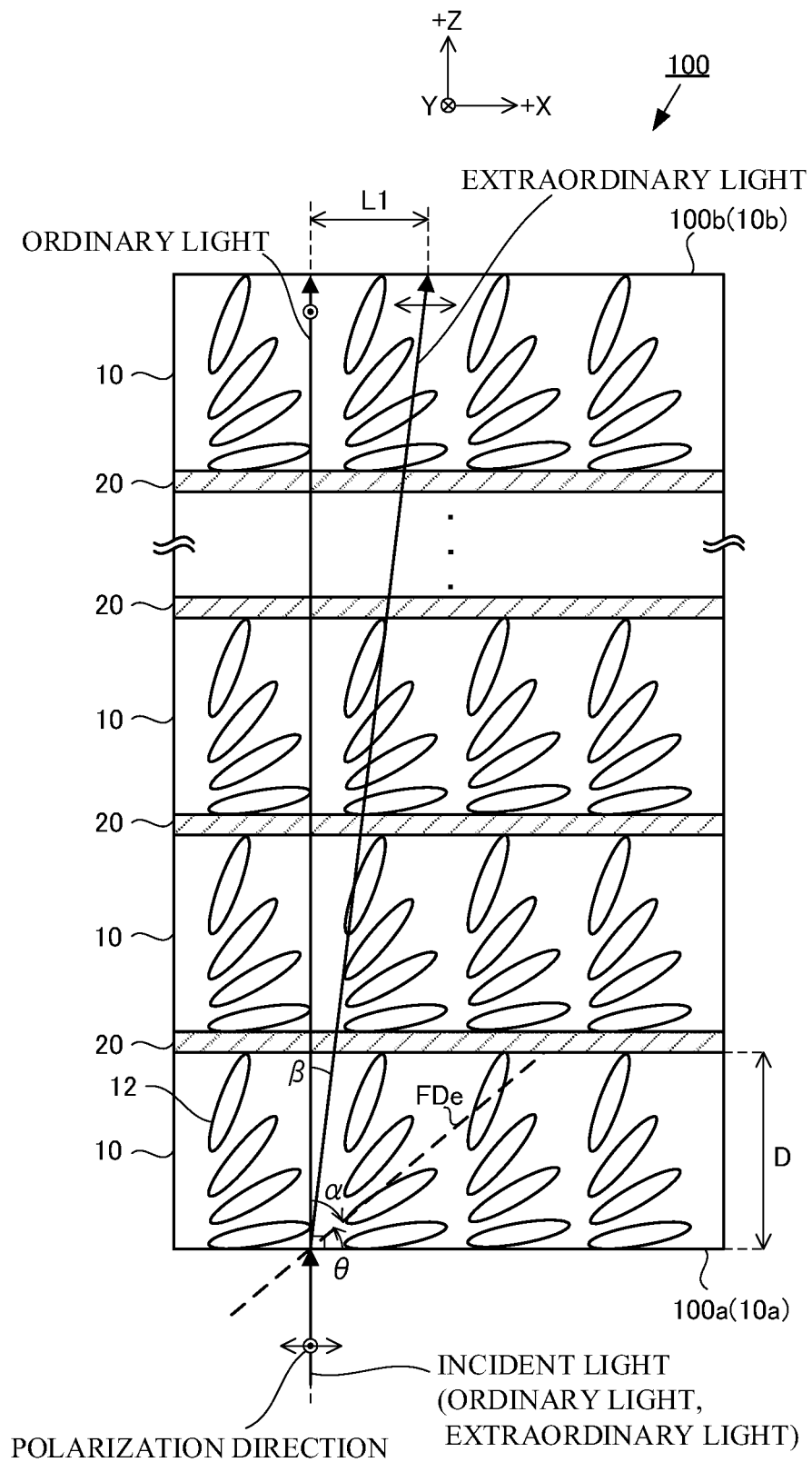
FIG. 4 is a schematic drawing for explaining the effects of the birefringence film according to Embodiment 1.
Figure 5:
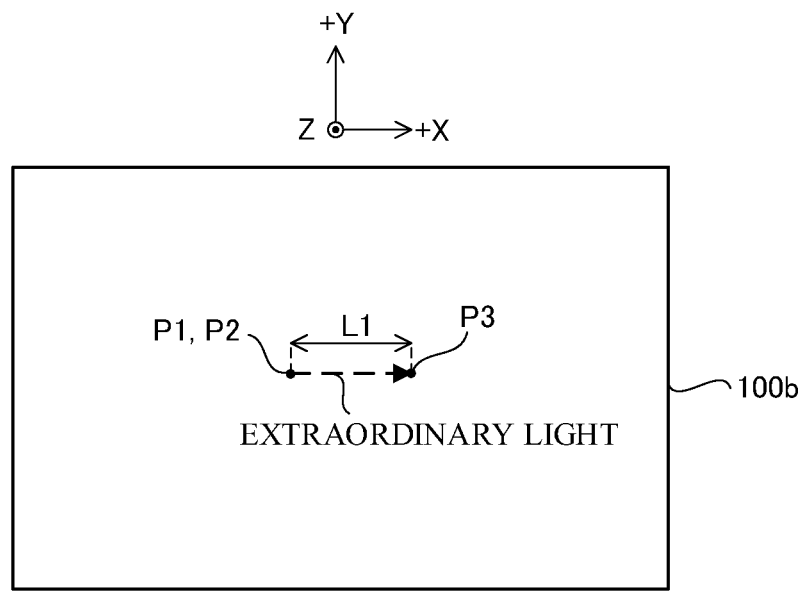
FIG. 5 is a schematic drawing for explaining the effects of the birefringence film according to Embodiment 1.

In the present embodiment, the extraordinary light axis FDe of the first birefringence layer 10 is inclined the angle θ with respect to the +X direction and, as such, when the extraordinary light perpendicularly enters the first main surface 100a of the birefringence film 100 (parallel to the Z direction), as illustrated in FIG. 4, the exit position of the extraordinary light on the second main surface 100b of the birefringence film 100 shifts, in the +X direction, an amount corresponding to a distance L1 from the entrance position on the first main surface 100a. However, when the ordinary light enters perpendicular to the first main surface 100a of the birefringence film 100, the ordinary light enters straight into the birefringence film 100. Accordingly, when the ordinary light and the extraordinary light enter at a same position P1 of the first main surface 100a, when viewing from above from the second main surface 100b side, as illustrated in FIG. 5, the ordinary light exits from a position P2 that is the same position as the position P1, and the extraordinary light exits from a position P3 shifted, in the +X direction, an amount corresponding to the distance L1 from the position P1. Specifically, the birefringence film 100 can shift, in the +X direction, the exit positions from the second main surface 100b (that is, the position P2 and the position P3) of the ordinary light and the extraordinary light, which entered at the same position (the position P1) of the first main surface 100a, the amount corresponding to the distance L1. Here, when ne is an extraordinary light refractive index of the liquid crystalline polymer, no is the ordinary light refractive index of the liquid crystalline polymer, θ is the average value of the tilt angles θe of the liquid crystalline polymer with respect to the first main surface 10a (the X direction) (that is, an angle θ of the extraordinary light axis FDe of the first birefringence layer 10 with respect to the first main surface 10a), a is an angle of the extraordinary light axis FDe of the first birefringence layer 10 with respect to the +Z direction, β is a refraction angle of the extraordinary light (the angle formed between the +Z direction and the refracted extraordinary light), and D is the thickness of the first birefringence layer 10, the distance L1 is expressed by Equations (1) to (3) below.

$$L1 = m \times D \times \tan\beta \quad (1)$$

$$\tan\beta = \frac{(ne^2 - no^2) \times \sin\alpha \times \cos\alpha}{ne^2 \times \cos^2\alpha + no^2 \times \sin^2\alpha} \quad (2)$$

$$\alpha = 90 - \theta \quad (3)$$

As is clear from Equations (1) to (3), by increasing the refraction index anisotropy Δn (Δn=ne−no), the refraction angle β (tan β) of the extraordinary light can be increased, and the thickness of the birefringence film 100 required to obtain the distance L1 can be reduced. Since the first birefringence layer 10 is formed from the liquid crystalline polymer that includes the polymerizable liquid crystal compound 12 that has large refraction index anisotropy Δn (for example, Δn=0.12 to 0.30), the thickness of the birefringence film 100 that is formed by stacking the first birefringence layer 10 can be made thinner than the thickness of a birefringence plate made from quartz (Δn=0.0092), lithium niobate (Δn=−0.083), or the like.

Figure 6:
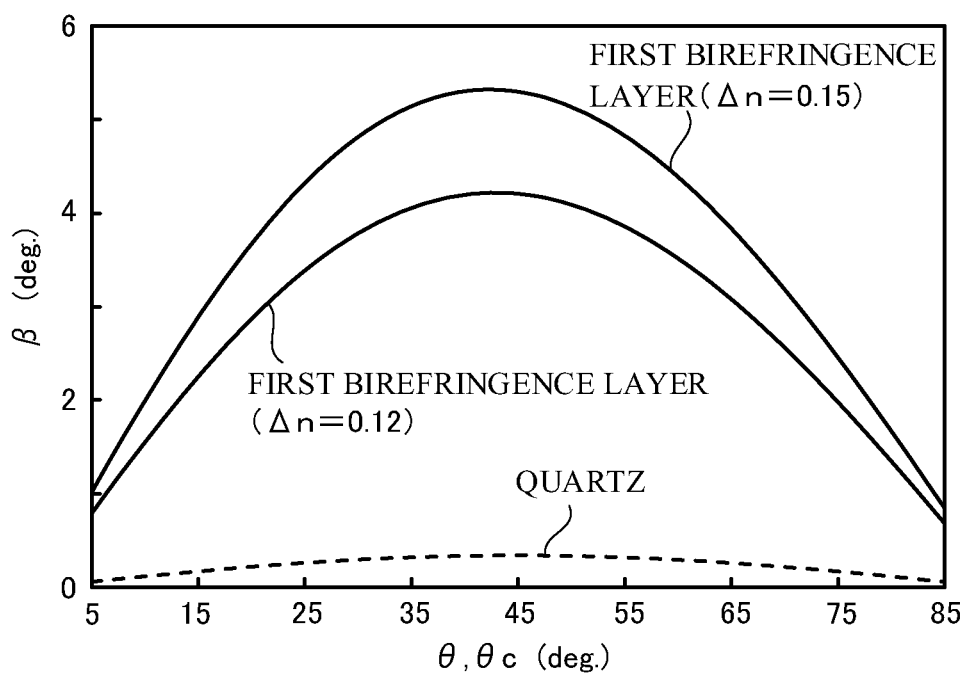
FIG. 6 is a drawing illustrating the dependence of a refraction angle of extraordinary light on an angle of an extraordinary light axis in the first birefringence layer according to Embodiment 1, and the dependence of the refraction angle of the extraordinary light on the angle of the extraordinary light axis in a birefringence plate made from quartz.

For example, FIG. 6 is a drawing illustrating the dependence of the refraction angle β of the extraordinary light on the angle θ of the extraordinary light axis FDe in the first birefringence layer 10 (refraction index anisotropy Δn of the polymerizable liquid crystal compound 12=0.12, 0.15), and the dependence of the refraction angle β of the extraordinary light on the angle θc (angle of the extraordinary light axis with respect to the +X direction) of the extraordinary light axis in a birefringence plate made from quartz (Δn=0.0092). These dependences are obtained from Equations (2) and (3). As illustrated in FIG. 6, the refraction angle β of the extraordinary light can be increased more in the first birefringence layer 10 that is formed from the polymerizable liquid crystal compound 12, which has large refraction index anisotropy Δn, than in the birefringence plate made from quartz. That is, the thickness of the birefringence film 100 required to obtain the distance L1 can be reduced.

As illustrated in FIG. 6, the refraction angle β of the extraordinary light has a maximum value with respect to the angle θ of the extraordinary light axis FDe. Accordingly, it is preferable that the first birefringence layer 10 is hybrid-aligned so as to have an angle θ of the extraordinary light axis FDe (that is, the average value θ of the tilt angles θe of the liquid crystalline polymer) that maximizes the refraction angle β of the extraordinary light. With such a configuration, the thickness of the birefringence film 100 can be reduced the most.

Figure 7:
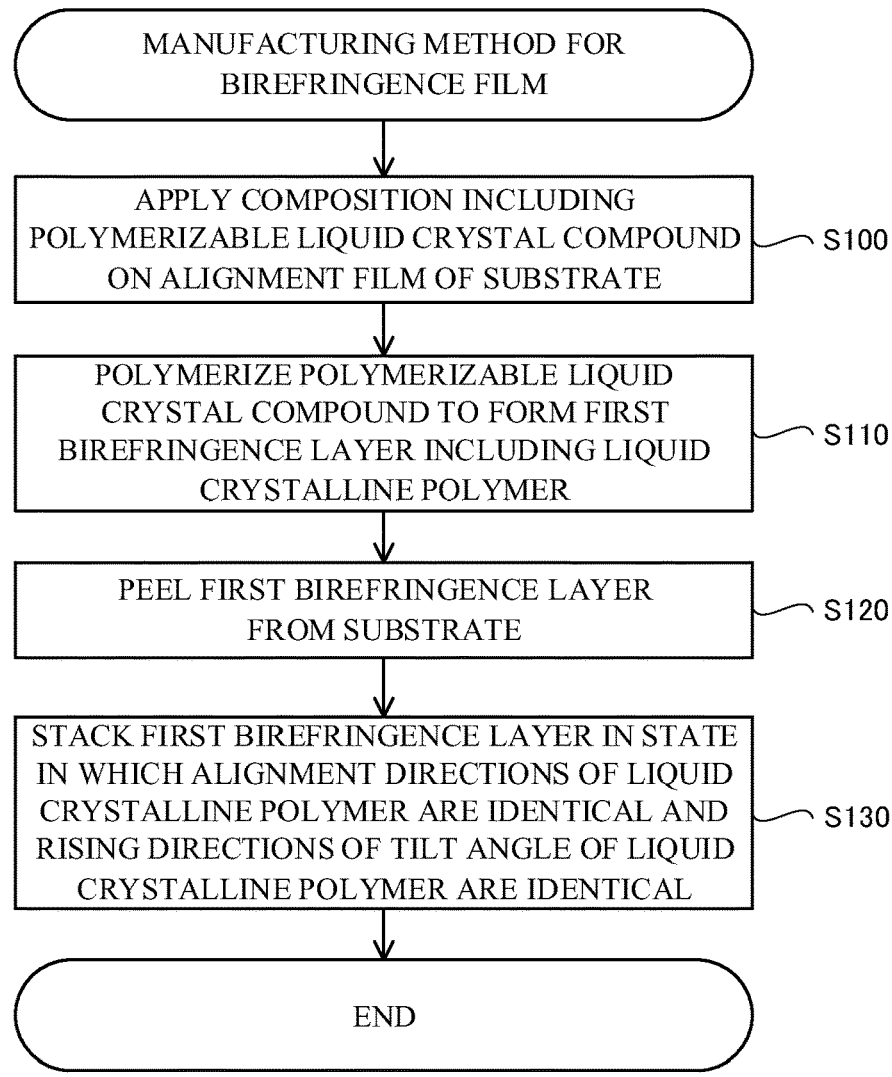
FIG. 7 is a flowchart illustrating a manufacturing method for the birefringence film according to Embodiment 1.
Figure 8:
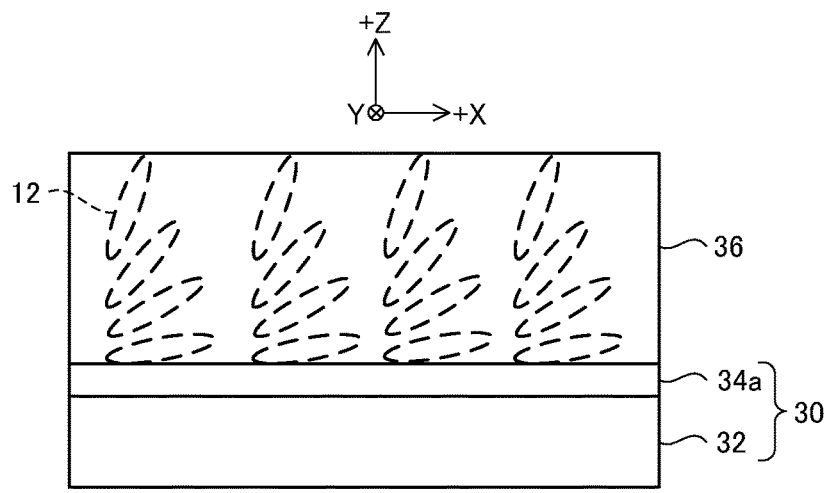
FIG. 8 is a schematic drawing for explaining a first application step according to Embodiment 1.
Figure 9:
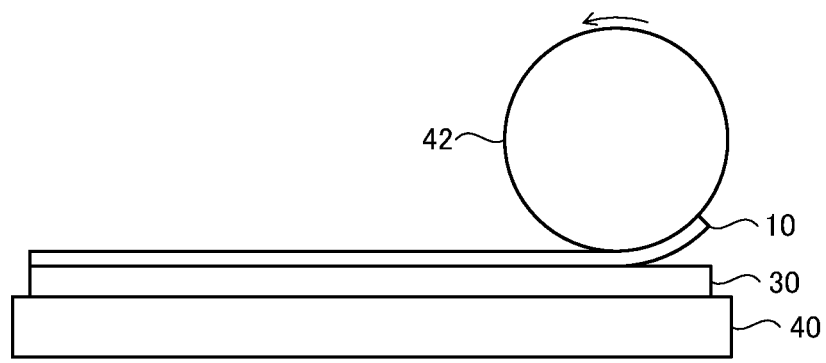
FIG. 9 is a schematic drawing for explaining a peeling step according to Embodiment 1.

Next, a manufacturing method for the birefringence film 100 is described while referencing FIGS. 7 to 9. FIG. 7 is a flowchart illustrating the manufacturing method for the birefringence film 100; The manufacturing method for the birefringence film 100 includes a first application step of applying a composition 36 including the polymerizable liquid crystal compound 12 on an alignment film 34a, subjected to alignment treatment, of a substrate 30 (step S100), a birefringence layer forming step of forming the first birefringence layer 10 that includes the hybrid-aligned liquid crystalline polymer by polymerizing the polymerizable liquid crystal compound 12 to fix the alignment of the polymerizable liquid crystal compound 12 (step S110), a peeling step of peeling the first birefringence layer 10 from the substrate 30 (step S120), and a first stacking step of stacking the peeled birefringence layer 10 in a state in which the alignment directions of the liquid crystalline polymer are identical and rising directions of the tilt angle θe of the liquid crystalline polymer are identical (step S130).

In step S100, as illustrated in FIG. 8, the composition 36 that includes the polymerizable liquid crystal compound 12 is applied on the alignment film 34a of the substrate 30. In one example, the composition 36 is applied on the alignment film 34a using a dispenser.

The substrate 30 includes a resin film 32 and the alignment film 34a. The alignment film 34a is subjected to alignment treatment (for example, rubbing treatment) for aligning the polymerizable liquid crystal compound 12 in the X direction. In one example, the resin film 32 is formed from an acrylic resin. In one example, the alignment film 34a is formed from polyimide. The composition 36 includes the polymerizable liquid crystal compound 12, a UV polymerization initiator, and the like. The composition 36 may include a plurality of types of the polymerizable liquid crystal compound 12 and, furthermore, may include liquid crystal compounds that do not polymerize, monomers that do not have liquid crystal properties, and the like. In the present embodiment, the polymerizable liquid crystal compound 12 included in the composition 36 contacts air and the alignment film 34a that has been subjected to the X-direction alignment treatment. The polymerizable liquid crystal compound 12 has a characteristic of aligning perpendicular to the air interface. Therefore, on the alignment film 34a interface side, the polymerizable liquid crystal compound 12 is aligned at an angle near horizontal with respect to the surface of the alignment film 34a, and continuously rises with respect to the surface of the alignment film 34a toward the air interface side. That is, the polymerizable liquid crystal compound 12 is hybrid-aligned.

In step S110, the composition 36 that is applied on the alignment film 34a is irradiated with UV light to polymerize the polymerizable liquid crystal compound 12 and fix the hybrid-alignment of the polymerizable liquid crystal compound 12. As a result, the first birefringence layer 10 including the hybrid-aligned liquid crystalline polymer is formed on the alignment film 34a.

In step S120, firstly, the substrate 30 is fixed on a surface plate 40 using an adhesive. Then, for example, as illustrated in FIG. 9, a peeling roller 42 having a surface on which an adhesive layer is provided is pressed against the formed first birefringence layer 10 to wind up the first birefringence layer 10 on the peeling roller 42, thereby peeling the first birefringence layer 10 from the substrate 30.

In step S130, a UV curable adhesive is applied to the second main surface 10b of the first birefringence layer 10, and m layers of the first birefringence layer 10 are stacked in a state in which the alignment directions of the liquid crystalline polymer are identical and the rising directions of the tilt angle θe of the liquid crystalline polymer are identical. Then, the stacked m layers of the first birefringence layer 10 are pressed in the thickness direction and, also, the UV curable adhesive is cured. Thus, the birefringence film 100 can be manufactured.

As described above, in the birefringence film 100, the first birefringence layers 10 are stacked in a state in which the alignment directions of the liquid crystalline polymer are identical and the rising directions of the tilt angle of the liquid crystalline polymer are identical. Since the first birefringence layer 10 is formed from the liquid crystalline polymer including the polymerizable liquid crystal compound 12, which has large refraction index anisotropy Δn, the thickness of the birefringence film 100 can be made thinner than the thickness of a birefringence plate make from quartz, lithium niobate, or the like. The birefringence film 100 can shift, in the +X direction, the exit positions from the second main surface 100b of the ordinary light and the extraordinary light that enter at the same the position of the first main surface 100a the amount corresponding to the distance L1.

Embodiment 2

With the birefringence film 100 of Embodiment 1, the first birefringence layers 10 are stacked with the adhesive layer 20 disposed therebetween. A configuration is possible in which, instead of the adhesive layer 20, the birefringence film 100 includes a protection layer 46 and an alignment film 34b.

Figure 10:
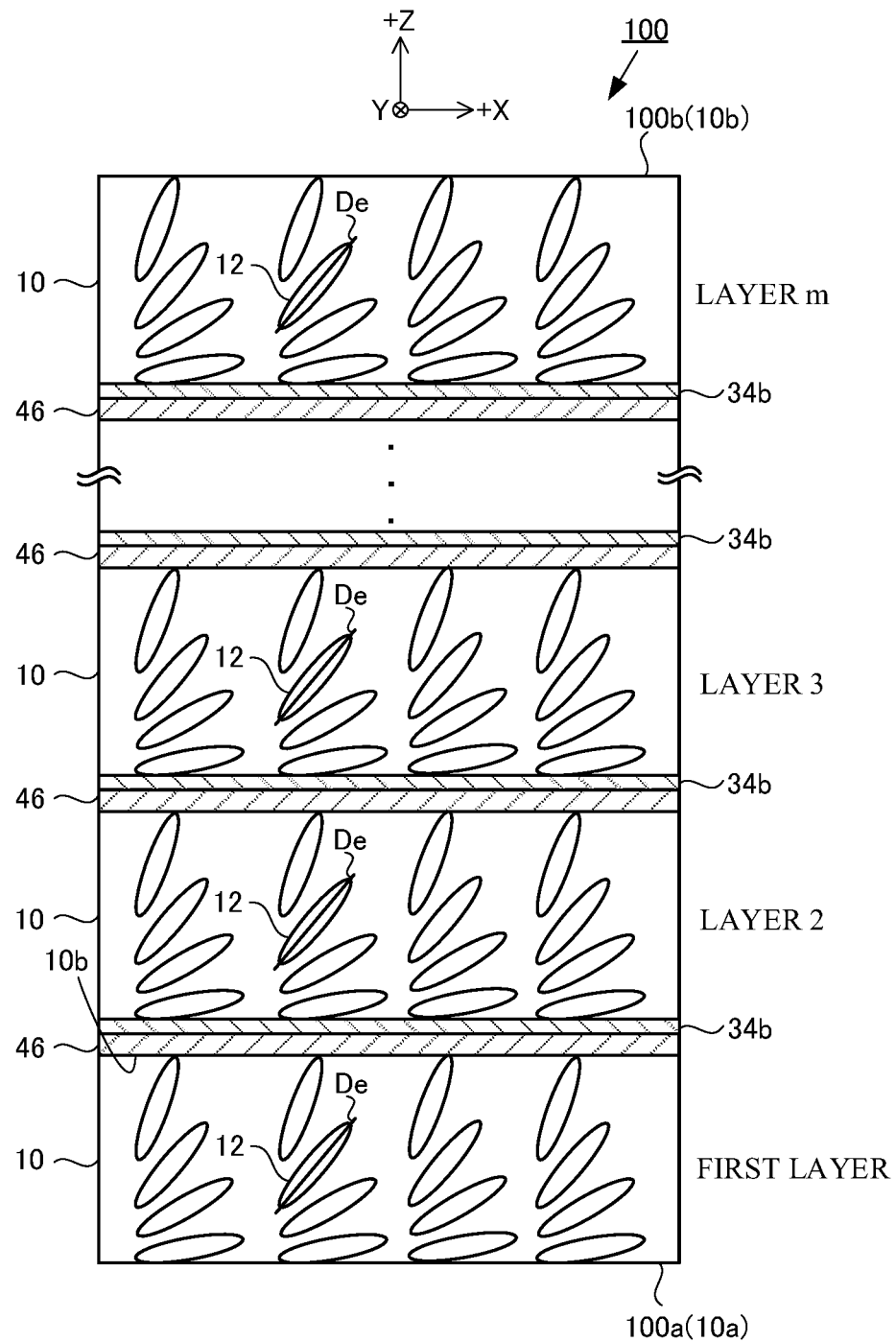
FIG. 10 is a schematic drawing illustrating a cross-section of a birefringence film according to Embodiment 2.

As illustrated in FIG. 10, the birefringence film 100 of the present embodiment includes a plurality of first birefringence layers 10, a protection layer 46, and an alignment film 34b. The plurality of first birefringence layers 10 are stacked, with the protection layer 46 and the alignment film 34b disposed therebetween. The other configurations of the birefringence film 100 of the present embodiment are the same as the configurations of the birefringence film 100 of Embodiment 1 and, as such, the protection layer 46 and the alignment film 34b are described.

The protection layer 46 is provided on the second main surface 10b of the first birefringence layer 10. The protection layer 46 protects the first birefringence layer 10 from the solvent of the alignment film 34b. In one example, the protection layer 46 is an acrylic resin layer.

The alignment film 34b of the present embodiment is formed on the protection layer 46. As with the alignment film 34a of Embodiment 1, the alignment film 34b of the present embodiment aligns the polymerizable liquid crystal compound 12 in the X direction.

Figure 11:
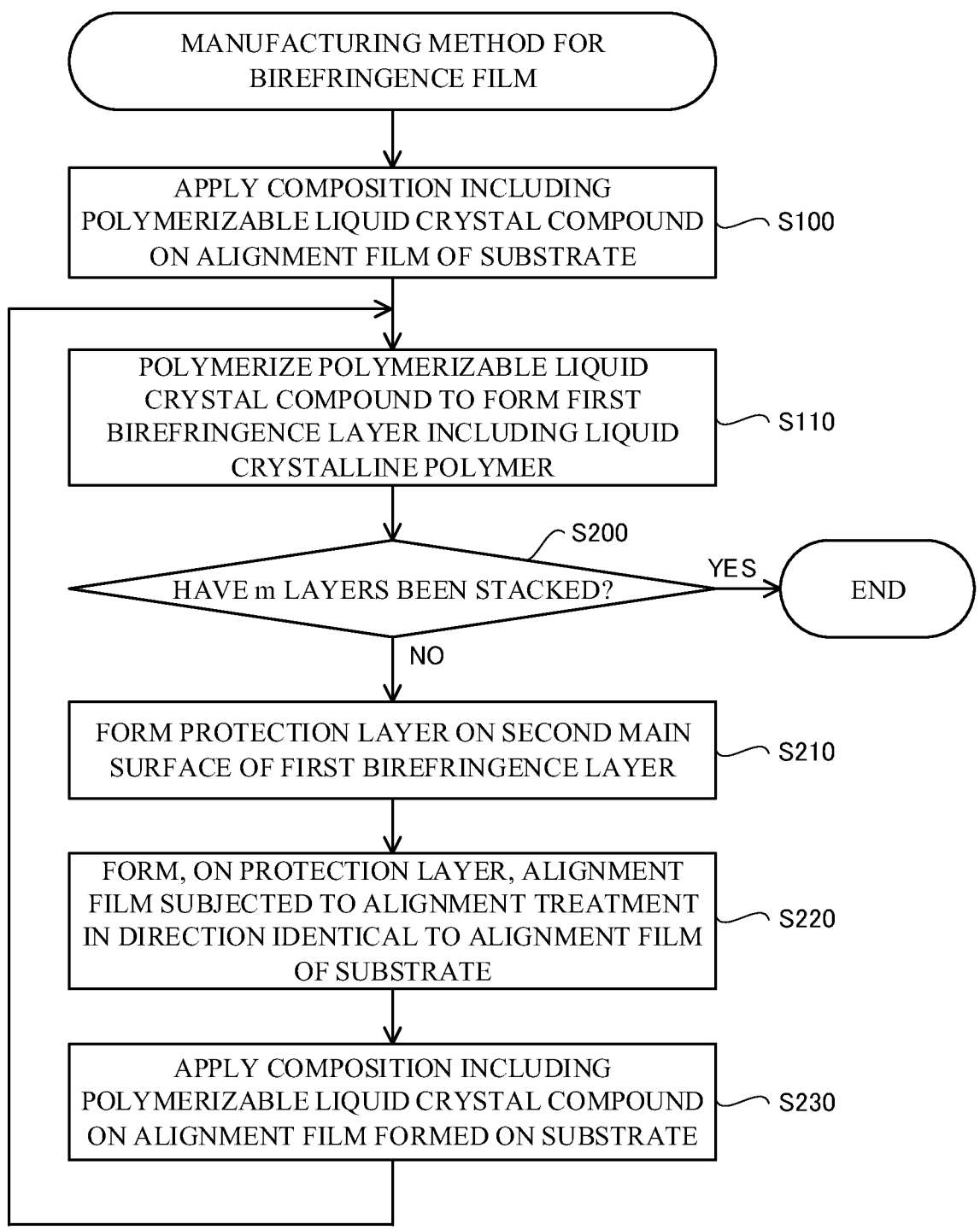
FIG. 11 is a flowchart illustrating a manufacturing method for the birefringence film according to Embodiment 2.
Figure 12:
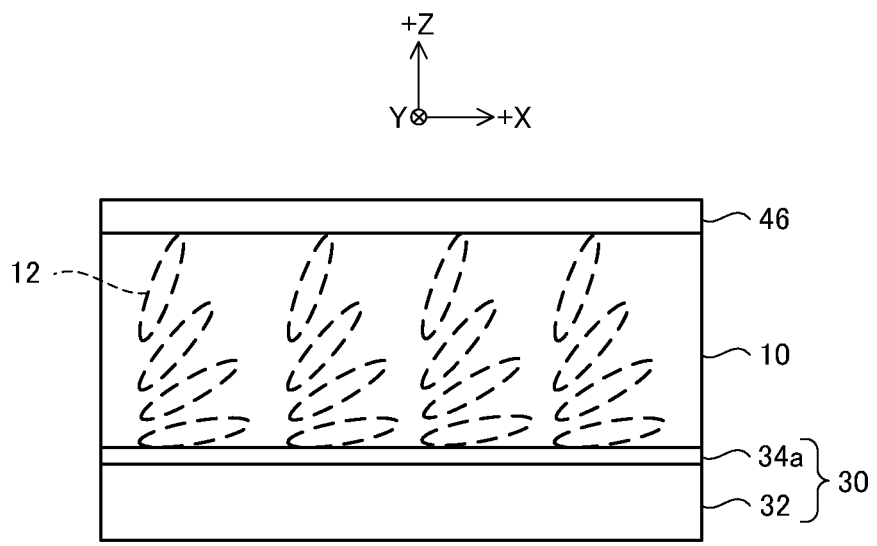
FIG. 12 is a schematic drawing for explaining a protection layer forming step according to Embodiment 2.

Next, a manufacturing method for the birefringence film 100 of the present embodiment is described while referencing FIGS. 10 to 12. FIG. 11 is a flowchart illustrating the manufacturing method for the birefringence film 100 of the present embodiment, The manufacturing method for the birefringence film 100 of the present embodiment includes a first application step of applying a composition 36 including the polymerizable liquid crystal compound 12 on the alignment film 34a, which is subjected to alignment treatment, of the substrate 30 (step S100), and a birefringence layer forming step of forming the first birefringence layer 10 that includes the hybrid-aligned liquid crystalline polymer by polymerizing the polymerizable liquid crystal compound 12 to fix the alignment of the polymerizable liquid crystal compound 12 (step S110). The manufacturing method for the birefringence film 100 of the present embodiment further includes a step of determining whether m layers of the first birefringence layer 10 are stacked (step S200), a protection layer forming step of forming the protection layer 46 on the first birefringence layer 10 (step S210), an alignment film forming step of forming, on the protection layer 46, the alignment film 34b that has been subjected to alignment treatment in the same direction as the alignment film 34a of the substrate 30 (step S220), and a second application step of applying the composition 36 including the polymerizable liquid crystal compound 12 on the alignment film 34b formed on the protection layer 46 (step S230). In the present embodiment, steps S210 to S230 and step S110 are repeated.

The first application step (step S100) and the birefringence layer forming step (step S110) of the present embodiment are the same as the first application step (step S100) and the birefringence layer forming step (step S110) of Embodiment 1.

In the present embodiment, firstly, steps S100 and S110 are carried out and the first layer of the first birefringence layer 10 is formed.

In step S200, firstly, the number of times step S110 has been executed is counted. When the number of times step S110 has been executed is less than m times, a determination is made that m layers of the first birefringence layer 10 are not stacked (step S200; NO). When a determination is made that m layers is not stacked, the manufacturing processing of step S210 is executed and the second and thereafter layers of the first birefringence layer 10 are stacked. When the number of times step S110 has been executed is m times, a determination is made that m layers of the first birefringence layer 10 are stacked, and the manufacturing processing is ended.

In step S210, the UV curable acrylic resin is applied on the formed first birefringence layer 10. Next, the applied UV curable acrylic resin is irradiated with UV light to form the protection layer 46 on the first birefringence layer 10 as illustrated in FIG. 12.

Figure 13:
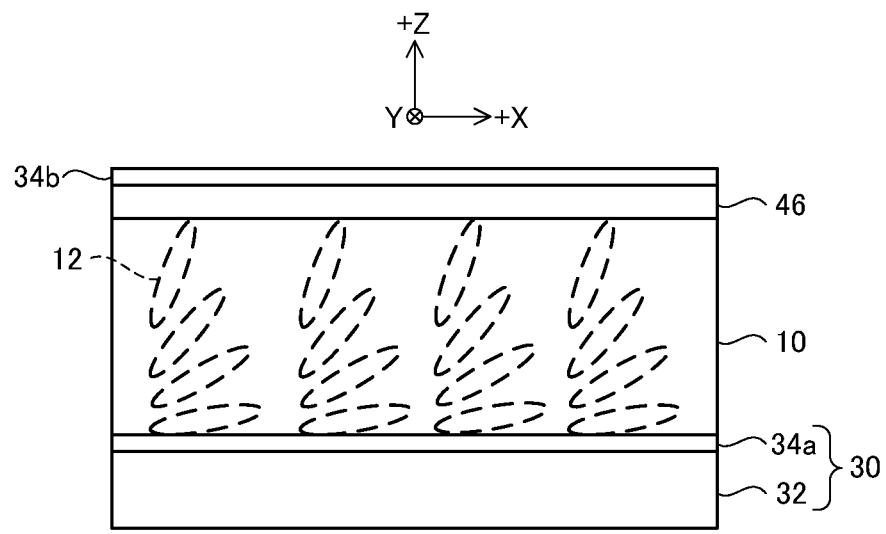
FIG. 13 is a schematic drawing for explaining an alignment film forming step according to Embodiment 2.

In step S220, the alignment film 34b is applied on the protection layer 46, and the applied alignment film 34b is baked to remove the solvent of the alignment film 34b. Next, the alignment film 34b on the protection layer 46 is subjected to alignment treatment in the same direction (that is, the X direction) as the alignment film 34a of the substrate 30. As a result, the alignment film 34b that is subjected to the alignment treatment is formed on the protection layer 46 as illustrated in FIG. 13.

Figure 14:
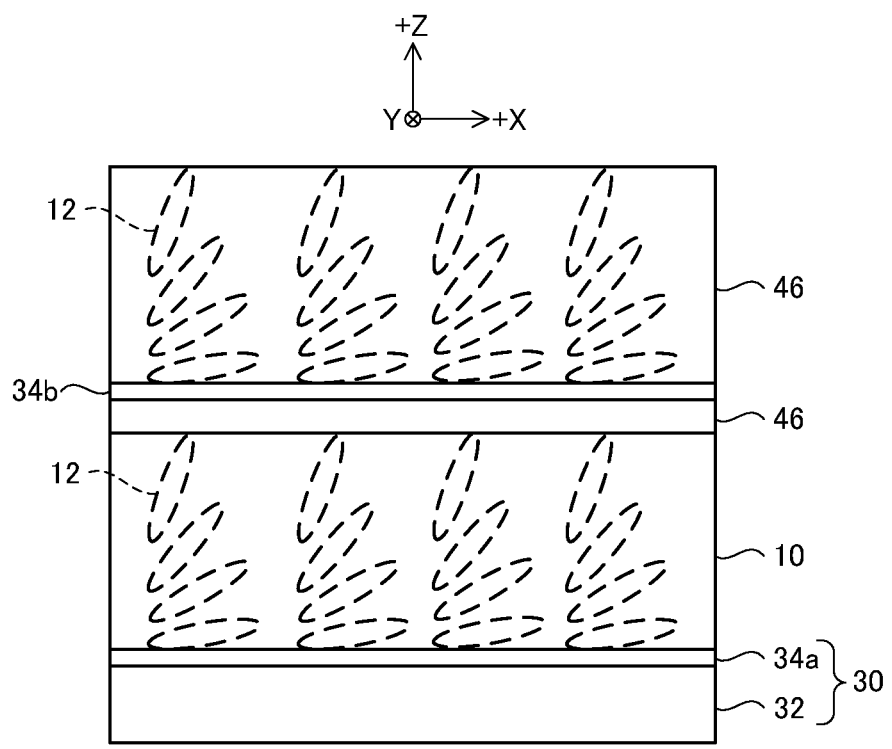
FIG. 14 is a schematic drawing for explaining a second application step according to Embodiment 2.

In step S230, using the same method as in step S100, the composition 36 is applied on the alignment film 34b formed on the protection layer 46. Since the alignment film 34b formed on the protection layer 46 is subjected to the same alignment treatment as the alignment film 34a of the substrate 30, the polymerizable liquid crystal compound 12 included in the composition 36 is aligned the same as the first layer of the first birefringence layer 10, as illustrated in FIG. 14. Accordingly, by polymerizing the polymerizable liquid crystal compound 12 in step S110, the first birefringence layers 10 are stacked in a state in which the alignment directions of the liquid crystalline polymer are identical and the rising directions of the tilt angle θe of the liquid crystalline polymer are identical. After step S230, the manufacturing processing of step S110 is executed.

Thus, the birefringence film 100 of the present embodiment can be manufactured. Note that the birefringence film 100 may be peeled from the substrate 30 after stacking m layers of the first birefringence layer 10.

In the present embodiment, it is not necessary to peel the first birefringence layer 10 from the substrate 30 each time first birefringence layer 10 is formed. As such, the birefringence film 100 can be manufactured easily with fewer steps.

In the present embodiment, as in Embodiment 1, since the first birefringence layer 10 is formed from the liquid crystalline polymer including the polymerizable liquid crystal compound 12, which has large refraction index anisotropy Δn, the thickness of the birefringence film 100 can be made thinner than the thickness of a birefringence plate make from quartz, lithium niobate, or the like. Additionally, the birefringence film 100 of the present embodiment can shift, in the +X direction, the exit positions from the second main surface 100b of the ordinary light and the extraordinary light that entered at the same the position of the first main surface 100a the amount corresponding to the distance L1.

Embodiment 3

The birefringence films 100 of Embodiment 1 and Embodiment 2 are formed by stacking a plurality of first birefringence layers 10. A configuration is possible in which the birefringence film 100 is formed by stacking a first birefringence layer 10 and a second birefringence layer 50.

Figure 15:
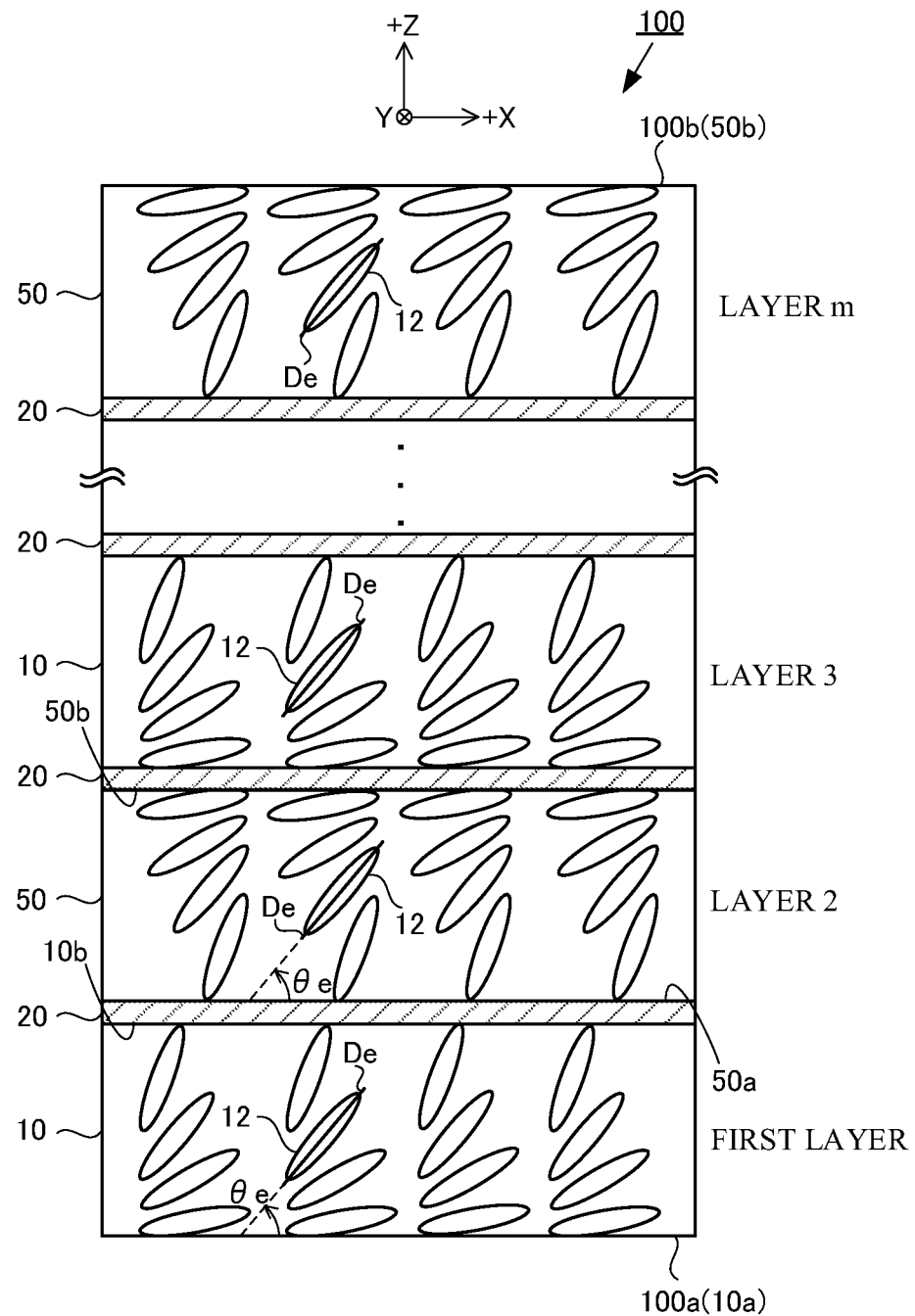
FIG. 15 is a schematic drawing illustrating a cross-section of a birefringence film according to Embodiment 3.

The birefringence film 100 of the present embodiment includes the first birefringence layer 10, the adhesive layer 20, and a second birefringence layer 50. As illustrated in FIG. 15, the birefringence film 100 of the present embodiment is formed by alternately stacking the first birefringence layer 10 and the second birefringence layer 50 with the adhesive layer 20 disposed therebetween. A total of m layers of the first birefringence layer 10 and the second birefringence layer 50 are stacked (m/2 layers of the first birefringence layer 10, and m/2 layers of the second birefringence layer 50).

The first birefringence layer 10 of the present embodiment is the same as the first birefringence layer 10 of Embodiment 1 and, as such, the second birefringence layer 50, and the stacking of the first birefringence layer 10 and the second birefringence layer 50 are described.

As illustrated in FIG. 15, the second birefringence layer 50 includes a first main surface 50a which light enters, and a second main surface 50b on the side opposite the first main surface 50a. The light that enters from the first main surface 50a exits from the second main surface 50b. As with the first birefringence layer 10, the second birefringence layer 50 is formed from a hybrid-aligned liquid crystalline polymer. In the present embodiment, a thickness D of the second birefringence layer 50 is the same as the thickness D of the first birefringence layer 10. Additionally, the second birefringence layer 50 and the first birefringence layer 10 are formed from the same composition 36.

Figure 16:
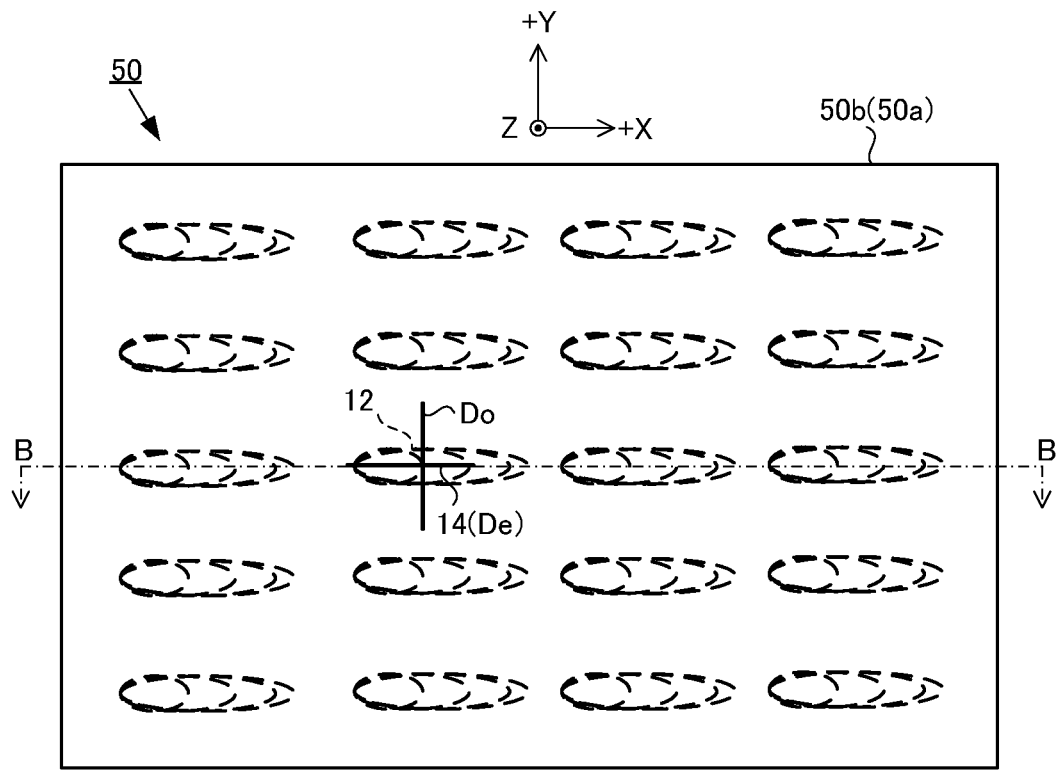
FIG. 16 is a schematic drawing of a second birefringence layer according to Embodiment 3, viewed from above.
Figure 17:
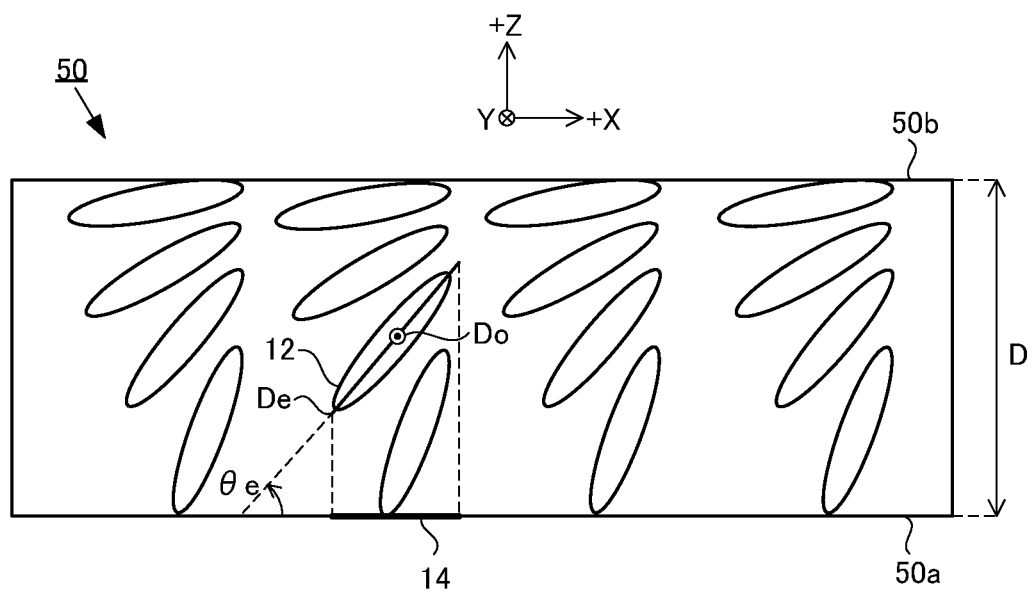
FIG. 17 is a cross-sectional view of the second birefringence layer illustrated in FIG. 16, taken along line B-B.

As illustrated in FIGS. 16 and 17, as with the first birefringence layer 10, the liquid crystalline polymer of the second birefringence layer 50 is aligned in the X direction and the tilt angle θe of the liquid crystalline polymer rises in the +Z direction with respect to the +X direction. Meanwhile, the tilt angle θe of the liquid crystalline polymer decreases continuously from the first main surface 50a toward the second main surface 50b. When viewed cross-sectionally on the XZ plane, the second birefringence layer 50 corresponds to a layer obtained by point-symmetrically moving the first birefringence layer 10. Accordingly, the average value θ of the tilt angles θe of the liquid crystalline polymer of the second birefringence layer 50 is equivalent to the average value θ of the tilt angles θe of the liquid crystalline polymer of the first birefringence layer 10.

In the present embodiment, as illustrated in FIG. 15, the first birefringence layer 10 and the second birefringence layer 50 are alternately stacked in a state in which the alignment directions of the liquid crystalline polymer are identical and the rising directions of the tilt angle θe of the liquid crystalline polymer are identical, the same as the first birefringence layer 10 of Embodiment 1 Furthermore, the average value θ of the tilt angles θe of the liquid crystalline polymer of the first birefringence layer 10 and the average value θ of the tilt angles θe of the liquid crystalline polymer of the second birefringence layer 50 are equivalent. Accordingly, as with the birefringence film 100 of Embodiment 1, the birefringence film 100 of the present embodiment can shift the exit positions from the second main surface 100b of the ordinary light and the extraordinary light that entered at the same the position of the first main surface 100a the amount corresponding to the distance L1. Furthermore, since the values of the tilt angle θe of the liquid crystalline polymer near the second main surface 10b of the first birefringence layer 10 and the first main surface 50a of the second birefringence layer 50 and the values of the tilt angle θe of the liquid crystalline polymer near the second main surface 50b of the second birefringence layer 50 and the first main surface 10a of the first birefringence layer 10, which are adhered to each other by the adhesive layer 20, are substantially equivalent, incident light scattering that occurs between the layers can be suppressed.

Next, a manufacturing method for the birefringence film 100 of the present embodiment is described while referencing FIGS. 18 to 21. The birefringence film 100 of present embodiment can be manufactured by folding the first birefringence layer 10 so that the alignment direction of the liquid crystalline polymer matches the X direction. As with the manufacturing method of Embodiment 1, the manufacturing method for the birefringence film 100 of the present embodiment includes a first application step (step S100), a birefringence layer forming step (step S110), a peeling step (step S120), and a first stacking step (S130). In the present embodiment, one sheet-like first birefringence layer 10 peeled from the substrate 30 is formed by executing steps S100 to S120. Since steps S100 to S120 of the present embodiment are the same as steps S100 to S120 of Embodiment 1, the first stacking step (step S130) of the present embodiment is described.

Figure 18:
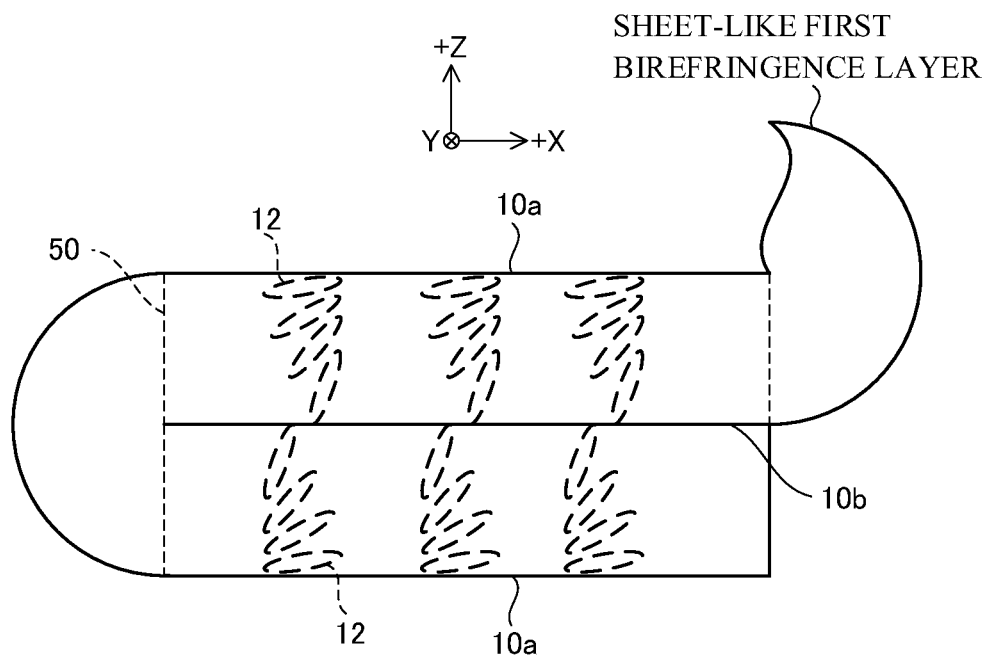
FIG. 18 is a schematic drawing for explaining the stacking of the first birefringence layer and the second birefringence layer according to Embodiment 3.

In step S130, the one sheet-like first birefringence layer 10 peeled from the substrate 30 is folded so that the alignment direction of the liquid crystalline polymer matches the X direction, and the first main surface 10a and the folded first main surface 10a, or the second main surface 10b and the folded second main surface 10b are adhered to each other. Since the second birefringence layer 50 corresponds to a layer obtained by point symmetrically moving the first birefringence layer 10, as illustrated in FIG. 18, it is possible to alternately stack the first birefringence layer 10 and the second birefringence layer 50 in a state in which the alignment directions of the liquid crystalline polymer are identical and the rising directions of the tilt angle θe of the liquid crystalline polymer are identical by folding the sheet-like first birefringence layer 10 so that the alignment direction of the liquid crystalline polymer matches the X direction.

Figure 19:
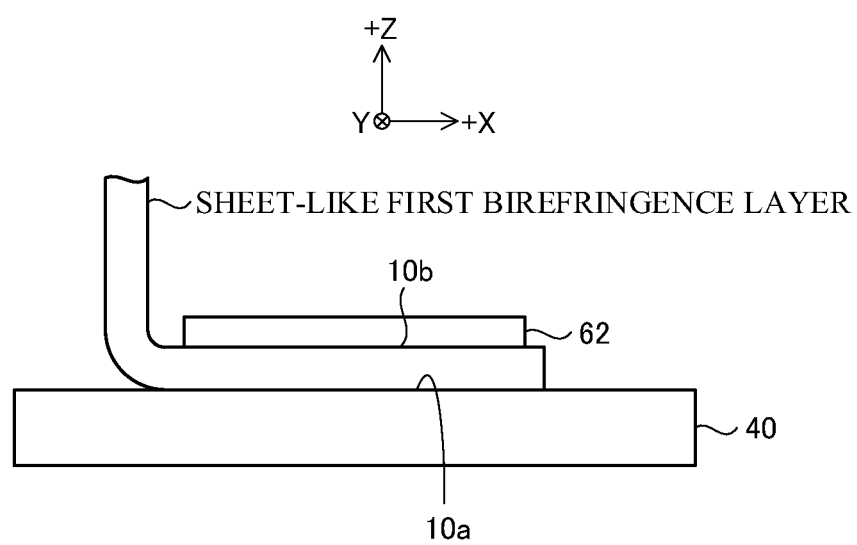
FIG. 19 is a schematic drawing for explaining a first stacking step according to Embodiment 3.
Figure 20:
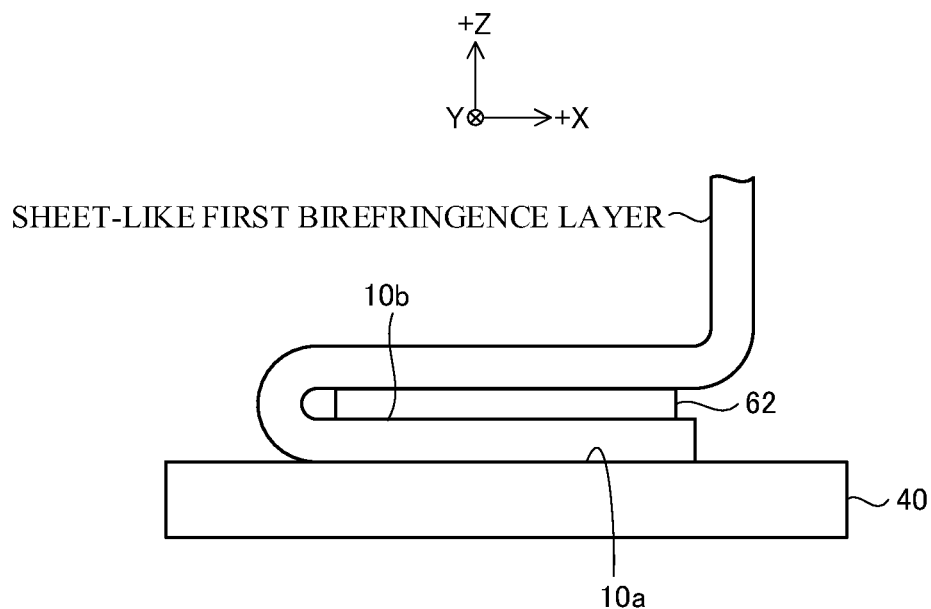
FIG. 20 is a schematic drawing for explaining the first stacking step according to Embodiment 3.
Figure 21:
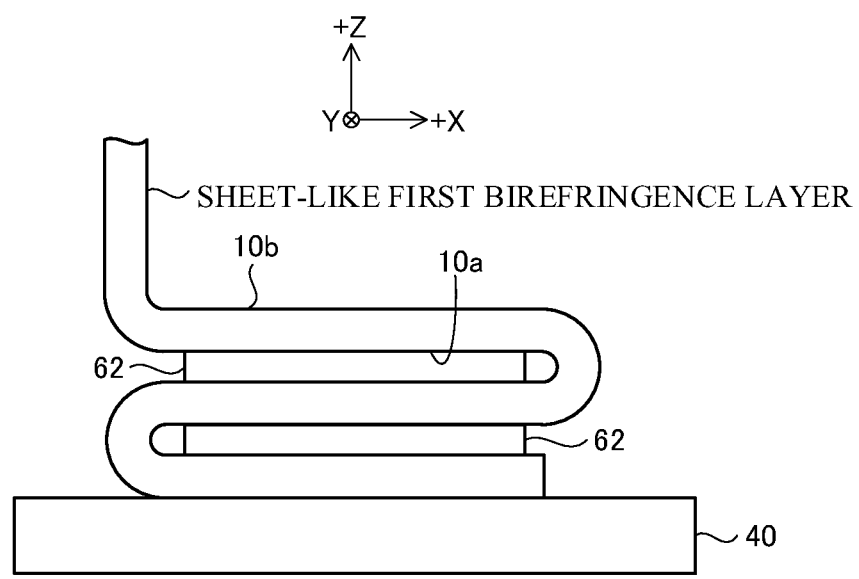
FIG. 21 is a schematic drawing for explaining the first stacking step according to Embodiment 3.

Specifically, firstly, as illustrated in FIG. 19, an adhesive 62 is applied to an upper surface (the second main surface 10b) of an edge of the sheet-like first birefringence layer 10 disposed on the surface plate 40. The adhesive 62 is applied having a width that corresponds to the length in the X direction of the birefringence film 100. Then, as illustrated in FIG. 20, the first birefringence layer 10 is folded over the adhesive 62 so that the alignment direction of the liquid crystalline polymer matches the X direction. As a result, the second main surface 10b and the folded second main surface 10b are adhered to each other via the adhesive 62. Next, the adhesive 62 is applied on the upper surface (the first main surface 10a) of the first birefringence layer 10 and, as illustrated in FIG. 21, the first birefringence layer 10 is folded in the opposite direction of the previous fold. As a result, the first main surface 10a and the folded first main surface 10a are adhered to each other via the adhesive 62. By repeating the application of the adhesive 62 and the folding of the first birefringence layer 10 described above, it is possible to alternately stack the first birefringence layer 10 and the second birefringence layer 50 in a state in which the alignment directions of the liquid crystalline polymer are identical and the rising directions of the tilt angle θe of the liquid crystalline polymer are identical.

After pressing the stacked first birefringence layers 10 second birefringence layers 50 in the thickness direction and curing the adhesive 62, the excess bent portion is removed. Thus, the birefringence film 100 of the present embodiment can be manufactured.

As described above, the birefringence film 100 of the present embodiment is formed by alternately stacking the first birefringence layer 10 in which the tilt angle θe of the liquid crystalline polymer continuously increases and the second birefringence layer 50 in which the tilt angle θe of the liquid crystalline polymer continuously decreases in a state in which the alignment directions of the liquid crystalline polymer are identical and the rising directions of the tilt angle θe of the liquid crystalline polymer are identical. The first birefringence layer 10 and the second birefringence layer 50 are stacked by folding one sheet-like first birefringence layer 10 so that the alignment directions of the liquid crystalline polymer match. Therefore, the birefringence film 100 of the present embodiment can be easily manufactured with fewer steps.

As in Embodiment 1, in the present embodiment, the thickness of the birefringence film 100 can be made thinner than the thickness of a birefringence plate make from quartz, lithium niobate, or the like. Furthermore, as with the birefringence film 100 of Embodiment 1, the birefringence film 100 of the present embodiment can shift, in the +X direction, the exit positions from the second main surface 100b of the ordinary light and the extraordinary light that entered at the same the position of the first main surface 100a the amount corresponding to the distance L1.

Embodiment 4

In Embodiments 1 to 3, the first birefringence layer 10 or the first birefringence layer 10 and the second birefringence layer 50 are stacked in a state in which the alignment directions of the liquid crystalline polymer are identical. A configuration is possible in which the birefringence layers are stacked in a state in which the alignment directions of the liquid crystalline polymer cross at 90°.

Figure 22:
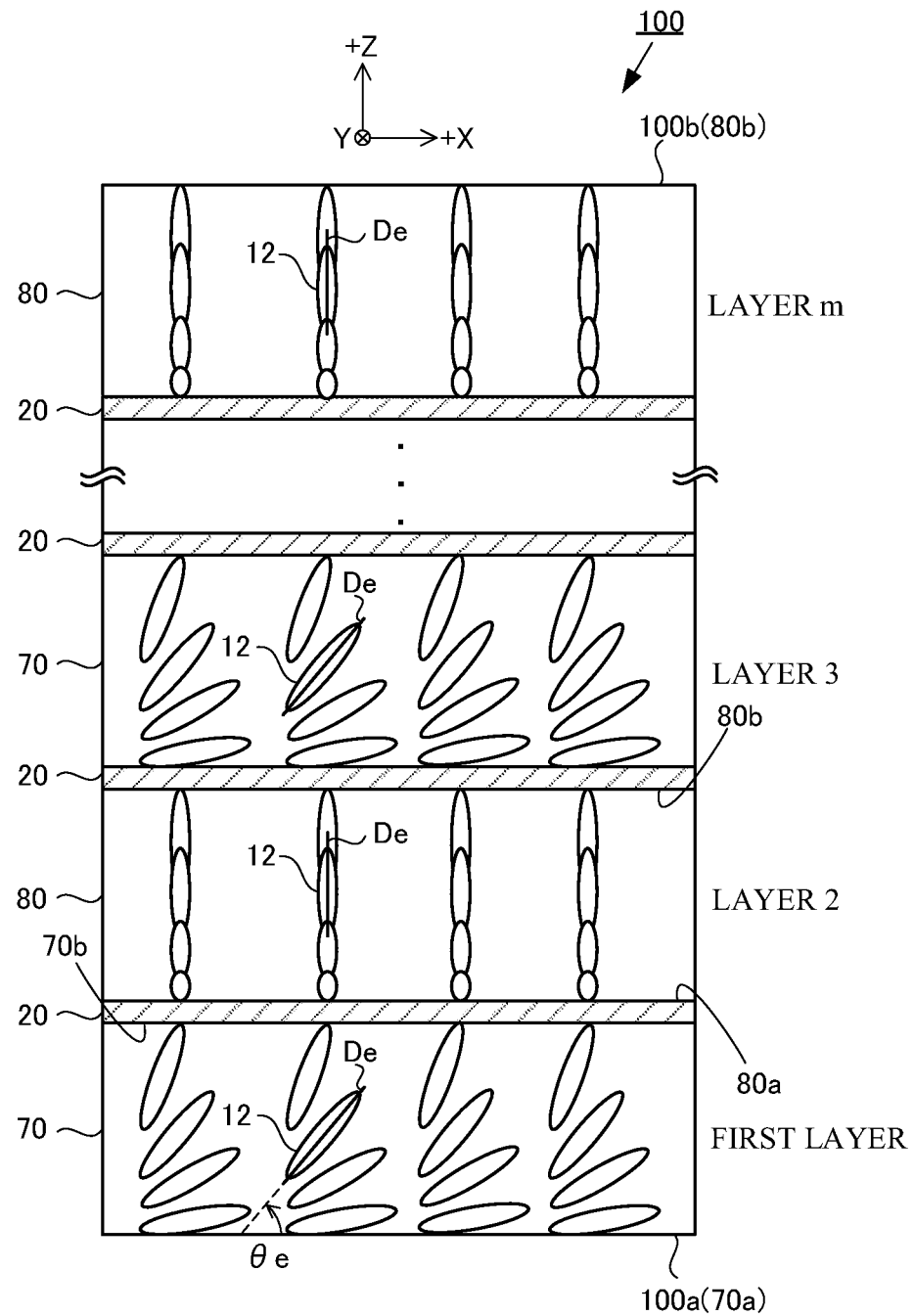
FIG. 22 is a schematic drawing illustrating a cross-section of a birefringence film according to Embodiment 4.

The birefringence film 100 of the present embodiment includes a third birefringence layer 70, the adhesive layer 20, and a fourth birefringence layer 80. As illustrated in FIG. 22, the birefringence film 100 of the present embodiment is formed by alternately stacking the third birefringence layer 70 and the fourth birefringence layer 80 with the adhesive layer 20 disposed therebetween. In the present embodiment, the liquid crystalline polymer of the third birefringence layer 70 is aligned in a predetermined first direction (the X direction), and the liquid crystalline polymer of the fourth birefringence layer 80 is aligned in a predetermined second direction (the Y direction) that crosses the predetermined first direction at 90°. A total of m layers of the third birefringence layer 70 and the fourth birefringence layer 80 are stacked (m/2 layers of the third birefringence layer 70, and m/2 layers of the fourth birefringence layer 80). The adhesive layer 20 of the present embodiment is the same as the adhesive layer 20 of Embodiment 1 and, as such, the third birefringence layer 70 and the fourth birefringence layer 80 are described.

The third birefringence layer 70 has the same configuration as the first birefringence layer 10 of Embodiment 1. Specifically, the liquid crystalline polymer of the third birefringence layer 70 is aligned in the X direction (the predetermined first direction). Additionally, the tilt angle θe of the liquid crystalline polymer rises in the +Z direction with respect to the +X direction, and continuously increases from a first main surface 70a toward a second main surface 70b.

The fourth birefringence layer 80 includes a first main surface 80a which light enters, and a second main surface 80b on the side opposite the first main surface 80a. The light that enters from the first main surface 80a exits from the second main surface 80b. As with the first birefringence layer 10 of Embodiment 1, the fourth birefringence layer 80 is formed from a hybrid-aligned liquid crystalline polymer. In the present embodiment, a thickness D of the fourth birefringence layer 80 is the same as a thickness D of the third birefringence layer 70.

Figure 23:
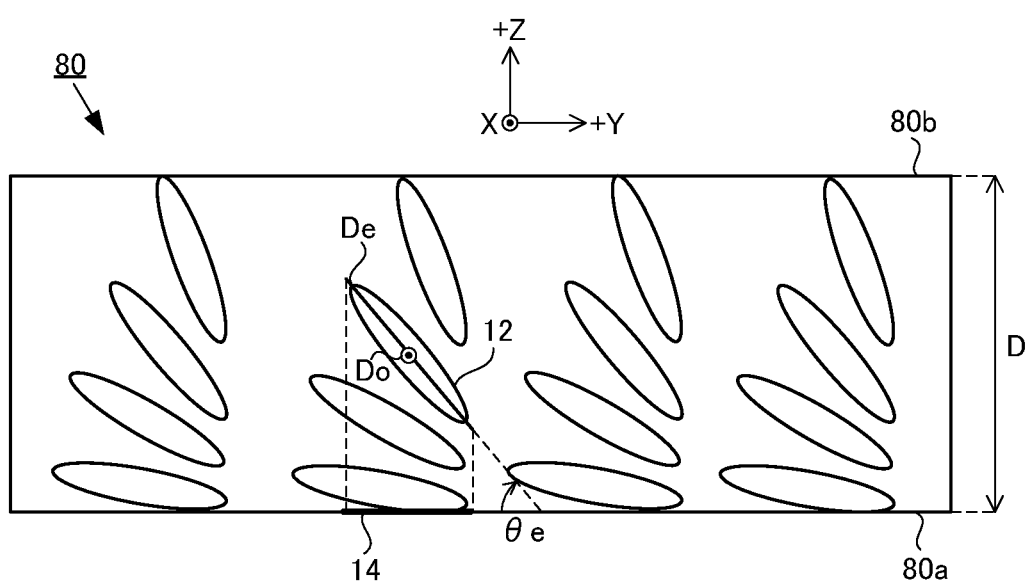
FIG. 23 is a schematic drawing illustrating a cross-section of a fourth birefringence layer according to Embodiment 4.

As illustrated in FIGS. 22 and 23, the liquid crystalline polymer of the fourth birefringence layer 80 is aligned in the Y direction (the predetermined second direction). Additionally, the tilt angle θe of the liquid crystalline polymer rises in the +Z with respect to the −Y direction, and continuously increases from a first main surface 80a toward the second main surface 80b. Note that the average value θ of the tilt angles θe of the liquid crystalline polymer of the third birefringence layer 70 and the average value θ of the tilt angles θe of the liquid crystalline polymer of the fourth birefringence layer 80 are equivalent.

Next, the effects of the birefringence film 100 of the present embodiment are described.

In the third birefringence layer 70, as with the first birefringence layer 10 of Embodiment 1, the extraordinary light axis FDe of the third birefringence layer 70 as a whole can be regarded as being inclined the average value θ of the tilt angles θe of the liquid crystalline polymer with respect to the +X direction. The ordinary light axis of the third birefringence layer 70 as a whole is parallel to the Y direction. Meanwhile, in the fourth birefringence layer 80, the extraordinary light axis FDe of the third birefringence layer 70 as a whole can be regarded as being inclined an average value θ of the tilt angles θe of the liquid crystalline polymer with respect to the −Y direction. The ordinary light axis of the fourth birefringence layer 80 as a whole is parallel to X direction.

Figure 24:
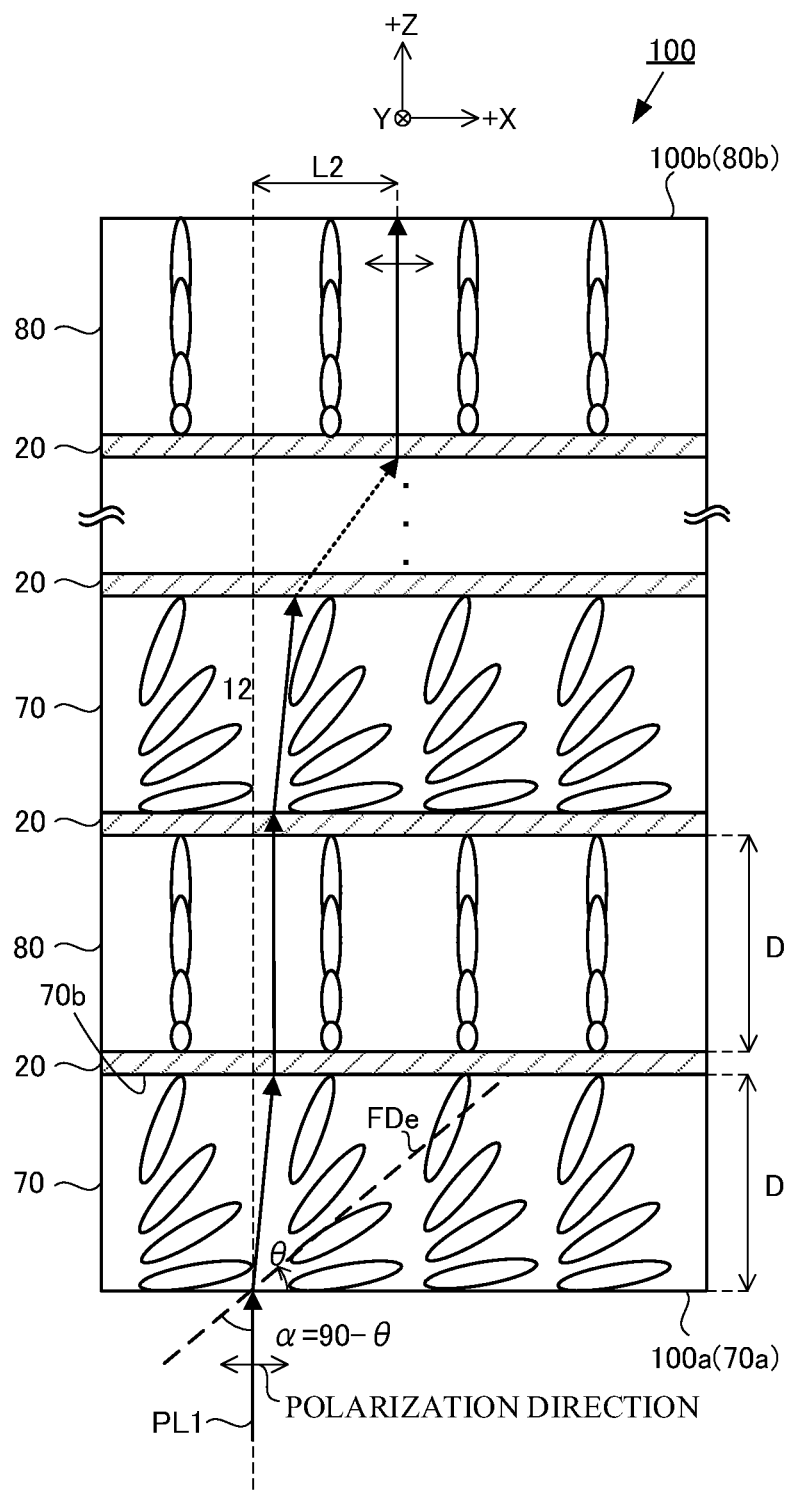
FIG. 24 is a schematic drawing for explaining the effects of the birefringence film according to Embodiment 4.

Accordingly, when the linearly polarized light PL1 for which the polarization direction is the X direction perpendicularly enters the first main surface 100a of the birefringence film 100 of the present embodiment, the linearly polarized light PL1 is refracted by the third birefringence layer 70 and is not refracted by the fourth birefringence layer 80, as illustrated in FIG. 24. Moreover, the exit position of the linearly polarized light PL1, for which the polarization direction is the X direction, on the second main surface 100b shifts, in the +X direction, an amount corresponding to a distance L2 from the entrance position on the first main surface 100a. Here, the distance L2 is expressed by Equation (4) below and Equations (2) and (3) above.

$$L2 = \frac{m}{2} \times D \times \tan\beta \qquad (4)$$

Meanwhile, when linearly polarized light PL2, for which the polarization direction is the Y direction, perpendicularly enters the first main surface 100a of the birefringence film 100 of the present embodiment, the linearly polarized light PL2 is refracted by the fourth birefringence layer 80 and is not refracted by the third birefringence layer 70. Moreover, the exit position of the linearly polarized light PL2, for which the polarization direction is the +Y direction, on the second main surface 100b shifts, in the −Y direction, an amount corresponding to the distance L2 from the entrance position on the first main surface 100a.

Figure 25:
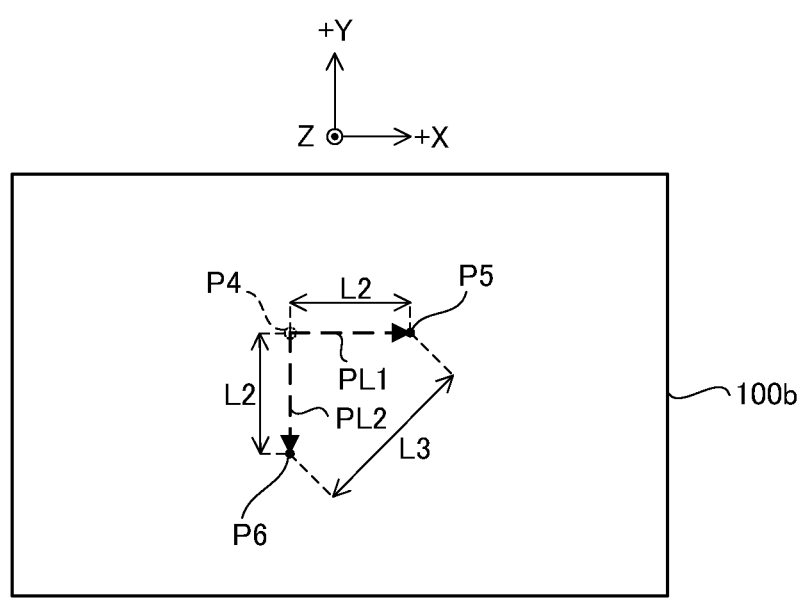
FIG. 25 is a top view for explaining the effects of the birefringence film according to Embodiment 4.

As described above, the exit position of the linearly polarized light PL1, for which the polarization direction is the X direction, shifts the distance L2 in the +X direction. Meanwhile, the exit position of the linearly polarized light PL2, for which the polarization direction is the Y direction, shifts the distance L2 in the −Y direction. Accordingly, when the linearly polarized light PL1 and the linearly polarized light PL2 enter at the same position P4 of the first main surface 100a, when viewing from above from the second main surface 100b side, as illustrated in FIG. 25, the linearly polarized light PL1 exits from a position P5 shifted, in the +X direction, an amount corresponding to the distance L2 from the position P4, and the linearly polarized light PL2 exits from a position P6 shifted, in the −Y direction, an amount corresponding to the distance L2 from the position P4. In the present embodiment, since the number of layers of the third birefringence layer 70 and the number of layers of the fourth birefringence layer 80 are equivalent, the birefringence film 100 of the present embodiment can shift the exit positions from the second main surface 100b (specifically the position P5 and the position P6) of the linearly polarized light PL1 and the linearly polarized light PL2 an amount corresponding to a distance L3 expressed by Equation (5) below.

$$L3 = \sqrt{2} \times L2 \qquad (5)$$

Figure 26:
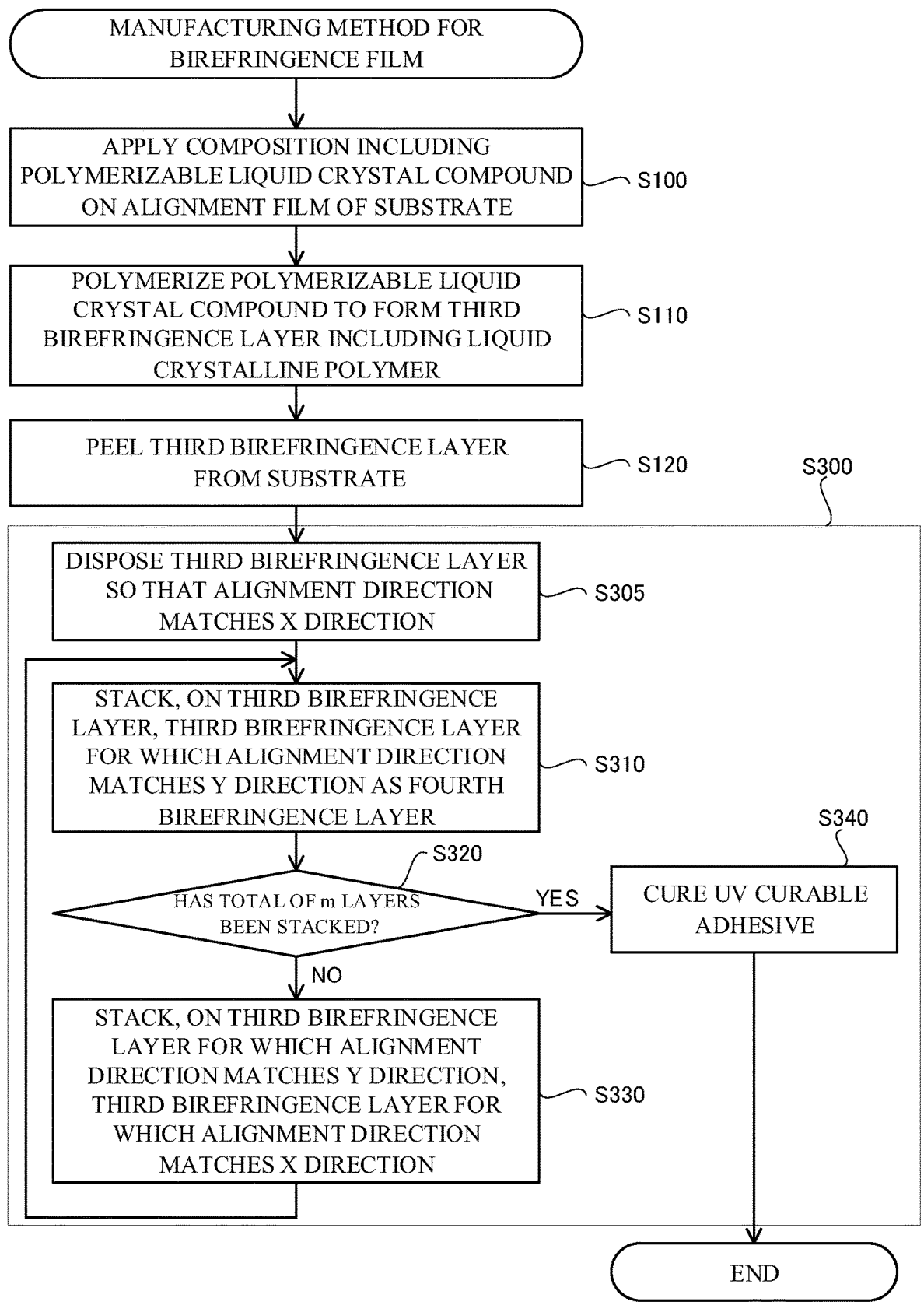
FIG. 26 is a flowchart illustrating a manufacturing method for the birefringence film according to Embodiment 4.

Next, a manufacturing method for the birefringence film 100 of the present embodiment is described. FIG. 26 is a flowchart illustrating the manufacturing method for the birefringence film 100 of the present embodiment. The manufacturing method for the birefringence film 100 includes a first application step (step S100), a birefringence layer forming step (step S110), a peeling step (step S120), and a second stacking step of stacking the peeled third birefringence layer 70 in a state in which an alignment direction of the liquid crystalline polymer is a predetermined first direction and in a state in which the alignment direction of the liquid crystalline polymer is a predetermined second direction that crosses the predetermined first direction at 90° (step S300). In the present embodiment, the third birefringence layer 70 peeled from the substrate 30 is formed by executing steps S100 to S120. Since steps S100 to S120 of the present embodiment are the same as steps S100 to S120 of Embodiment 1, the second stacking step (step S300) of the present embodiment is described.

Step S300 includes a step of disposing the third birefringence layer 70 so that the alignment direction of the liquid crystalline polymer matches the X direction (the predetermined first direction) (step S305), a step of stacking a third birefringence layer 70, for which the alignment direction of the liquid crystalline polymer matches the Y direction (the predetermined second direction), as the fourth birefringence layer 80 on the third birefringence layer 70 using a UV curable adhesive (step S310), a step of determining whether a total of m layers of the third birefringence layer 70 and the fourth birefringence layer 80 are stacked (step S320), a step of stacking a third birefringence layer 70, for which the alignment direction of the liquid crystalline polymer matches the X direction, on the third birefringence layer 70 (that is, the fourth birefringence layer 80), for which the alignment direction of the liquid crystalline polymer matches the Y direction, using the UV curable adhesive (step S330), and a step of curing the UV curable adhesive (step S340).

In step S305, the first layer (m=1) of the third birefringence layer 70 is disposed such that the alignment direction of the liquid crystalline polymer matches the X direction.

In step S310, firstly, the UV curable adhesive is applied on the second main surface 70b of the third birefringence layer 70. Next, the third birefringence layer 70, for which the alignment direction of the liquid crystalline polymer matches the Y direction, is stacked as the fourth birefringence layer 80 on the applied UV curable adhesive.

In step S320, firstly, the number of times step S310 has been executed is counted. When the number of times step S310 has be executed is less than m/2 times, a determination is made that a total of m layers of the third birefringence layer 70 and the fourth birefringence layer 80 is not stacked (step S320; NO). When a determination is made that a total of m layers is not stacked, the manufacturing processing of step S330 is executed and the third birefringence layer 70 is stacked. When the number of times step S310 has been executed is m/2 times, a determination is made that a total of m layers of the third birefringence layer 70 and the fourth birefringence layer 80 is stacked (step S320; YES). When a determination is made that a total of m layers is stacked, the manufacturing processing of step S340 is executed and the UV curable adhesive is cured.

In step S330, the UV curable adhesive is applied on the third birefringence layer 70 (the fourth birefringence layer 80) for which the alignment direction of the liquid crystalline polymer matches the Y direction. Next, the third birefringence layer 70, for which the alignment direction of the liquid crystalline polymer matches the X direction, is stacked on the applied UV curable adhesive. After step S330, the manufacturing processing of step S310 is executed.

In step S340, the stacked total of m layers of the third birefringence layer 70 and the fourth birefringence layer 80 is pressed in the thickness direction and, also, the UV curable adhesive is cured. Thus, the birefringence film 100 of the present embodiment can be manufactured.

As described above, with the birefringence film 100 of the present embodiment, the third birefringence layer 70, in which the liquid crystalline polymer is aligned in the X direction (the predetermined first direction), and the fourth birefringence layer 80, in which the liquid crystalline polymer is aligned in the Y direction (the predetermined second direction), are alternately stacked. Since the third birefringence layer 70 and the fourth birefringence layer 80 are formed from the liquid crystalline polymer including the polymerizable liquid crystal compound 12, which has large refraction index anisotropy Δn, the thickness of the birefringence film 100 of the present embodiment can be made thinner than the thickness of a birefringence plate make from quartz, lithium niobate, or the like. Additionally, the birefringence film 100 of the present embodiment can shift the exit positions of the linearly polarized light PL1, for which the polarization direction is the X direction, and the linearly polarized light PL2, for which the polarization direction is the Y direction, an amount corresponding to the distance L3.

Embodiment 5

Figure 27:
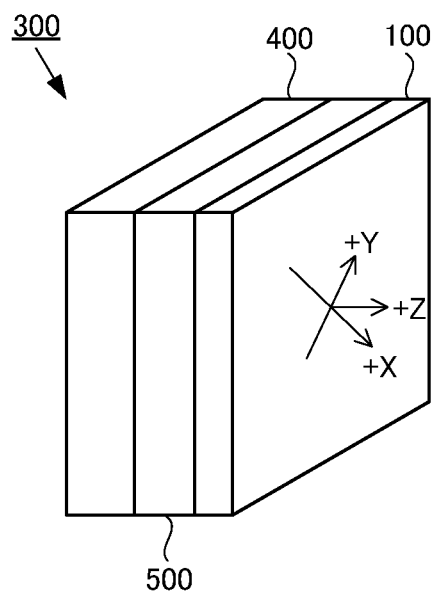
FIG. 27 is a schematic drawing illustrating a display device according to Embodiment 5.

In the present embodiment, a display device 300 including the birefringence film 100 of Embodiment 1 is described. As illustrated in FIG. 27, the display device 300 includes a display panel 400, a polarization switching element 500, and the birefringence film 100 of Embodiment 1. In the present embodiment, an observer is positioned on the +Z side of the display device 300. A 45° direction that equally bisects the X direction and the Y direction corresponds to a left-right direction of the observer, and a direction orthogonal to the 45° direction equally bisecting the X direction and the Y direction corresponds to an up-down direction of the observer.

Figure 28:
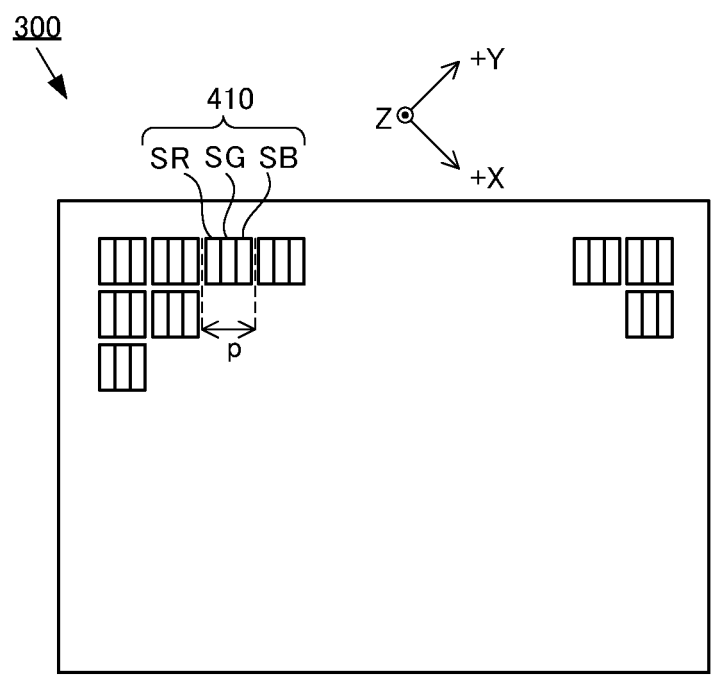
FIG. 28 is a plan view illustrating a display panel according to Embodiment 5.

In one example, the display panel 400 is implemented as a transmissive twisted nematic (TN) liquid crystal display that is active matrix-driven by a thin film transistor (TFT) and that is provided with a back light. As illustrated in FIG. 28, the display panel 400 includes a plurality of pixels 410 arranged at a pixel pitch p. When viewing the display device 300 from above, the plurality of pixels 410 are arranged in the 45° direction that equally bisects the X direction and the Y direction, and in the direction orthogonal to the 45° direction equally bisecting the X direction and the Y direction. The pixels 410 include a subpixel SR that emits red light, a subpixel SG that emits green light, and a subpixel SB that emits blue light.

The display panel 400 emits, as display light displaying an image, text, or the like, first linearly polarized light for which the polarization direction is the Y direction (predetermined third direction). The display light emitted from the display panel 400 enters the polarization switching element 500.

In one example, the polarization switching element 500 is implemented as a TN liquid crystal element that has a twist angle of 90°. The polarization switching element 500 is disposed between the display panel 400 and the birefringence film 100 of Embodiment 1. The polarization switching element 500 switches the display light from the display panel 400 (that is, the first linearly polarized light) between the first linearly polarized light and a second linearly polarized light. Here, the polarization direction of the second linearly polarized light is the X direction that is orthogonal to the polarization direction (the Y direction) of the first linearly polarized light. Moreover, the polarization switching element 500 emits the display light onto the first main surface 100a of the birefringence film 100 of Embodiment 1. The first linearly polarized light for which the polarization direction is the Y direction corresponds to the ordinary light on the birefringence film 100 of Embodiment 1. Meanwhile, the second linearly polarized light for which the polarization direction is the X direction corresponds to the extraordinary light on the birefringence film 100 of Embodiment 1.

As described in Embodiment 1, the birefringence film 100 of Embodiment 1 can shift, in the +X direction, the exit positions from the second main surface 100b of the ordinary light and the extraordinary light that entered the first main surface 100a the amount corresponding to the distance L1. Accordingly, in a case in which the light that enters the birefringence film 100 from the polarization switching element 500 is the first linearly polarized light and in a case in which the light that enters the birefringence film 100 from the polarization switching element 500 is the second linearly polarized light, it is sufficient that the distance L1 and the pixel pitch p of the display panel 400 satisfy Equation (6) below in order to optically shift the position of the pixels 410 an amount corresponding to p/2 in the left-right direction of the observer (the 45° direction equally bisecting the X direction and the Y direction) and an amount corresponding to p/2 in the up-down direction of the observer (the direction orthogonal to the 45° direction equally bisecting the X direction and the Y direction).

$$L1 = \frac{\sqrt{2}}{2} \times p \tag{6}$$

Figure 29:
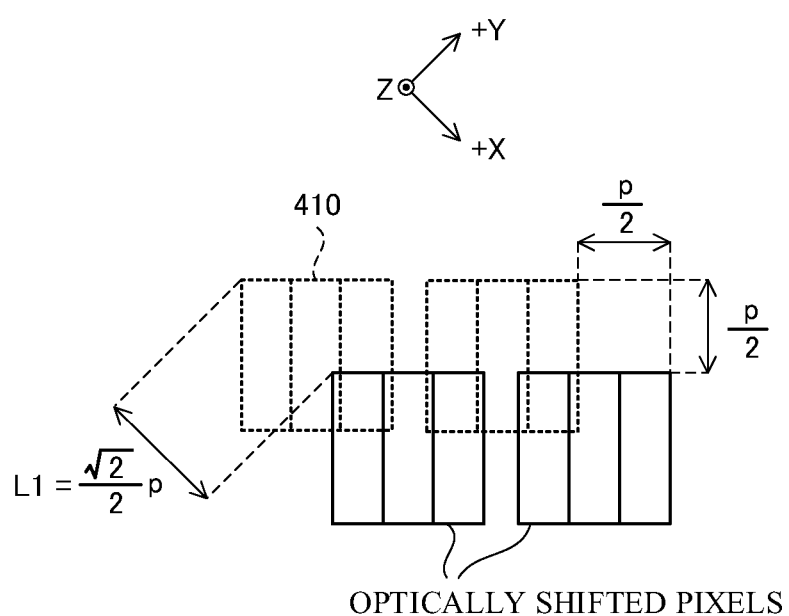
FIG. 29 is a schematic drawing illustrating optically shifted pixels according to Embodiment 5.

In the present embodiment, the display light from the display panel 400 is switched, by the polarization switching element 500, between the first linearly polarized light and the second linearly polarized light in time divisions. When the display light from the display panel 400 is the first linearly polarized light, the first linearly polarized light corresponds to the ordinary light on the birefringence film 100 of Embodiment 1 and, as such, the observer recognizes the position of the pixels 410 as a position on the display panel 400. However, when the display light from the display panel 400 is the second linearly polarized light, the second linearly polarized light corresponds to the extraordinary light on the birefringence film 100 of Embodiment 1 and, as such, the observer recognizes the position of the pixels 410 as a position shifted, from the position on the display panel 400, an amount corresponding to p/2 in the left-right direction of the observer (the 45° direction equally bisecting the X direction and the Y direction) and an amount corresponding to p/2 in the up-down direction of the observer (the direction orthogonal to the 45° direction equally bisecting the X direction and the Y direction), as illustrated in FIG. 29.

In the present embodiment, images corresponding to the position of the pixels 410 recognized by the observer are displayed in time divisions on the display panel 400, synchronized with the timing of the polarization switching element 500 switching, in time divisions, the display light from the display panel 400 to the first linearly polarized light and the second linearly polarized light. As a result, the display device 300 can display images with enhanced resolution.

As described above, the display device 300 can display images with enhanced resolution. Additionally, the thickness of the birefringence film 100 of Embodiment 1 is thin and, as such, the thickness of the display device 300 can be reduced.

Modified Examples

Embodiments have been described, but various modifications can be made to the present disclosure without departing from the spirit and scope of the present disclosure.

For example, the polymerizable liquid crystal compound 12 is not limited to a rod-like polymerizable liquid crystal compound that forms a nematic layer. A configuration is possible in which the polymerizable liquid crystal compound 12 is a polymerizable discotic liquid crystal.

The substrate 30 of the present embodiment includes the resin film 32 and the alignment film 34a, but a configuration is possible in which the substrate 30 includes a release layer between the resin film 32 and the alignment film 34a. In one example, the release film is formed from a silicon material. When the substrate 30 includes the release layer between the resin film 32 and the alignment film 34a, the first birefringence layer 10 of Embodiment 1 peels together with the alignment film 34a.

Figure 30:
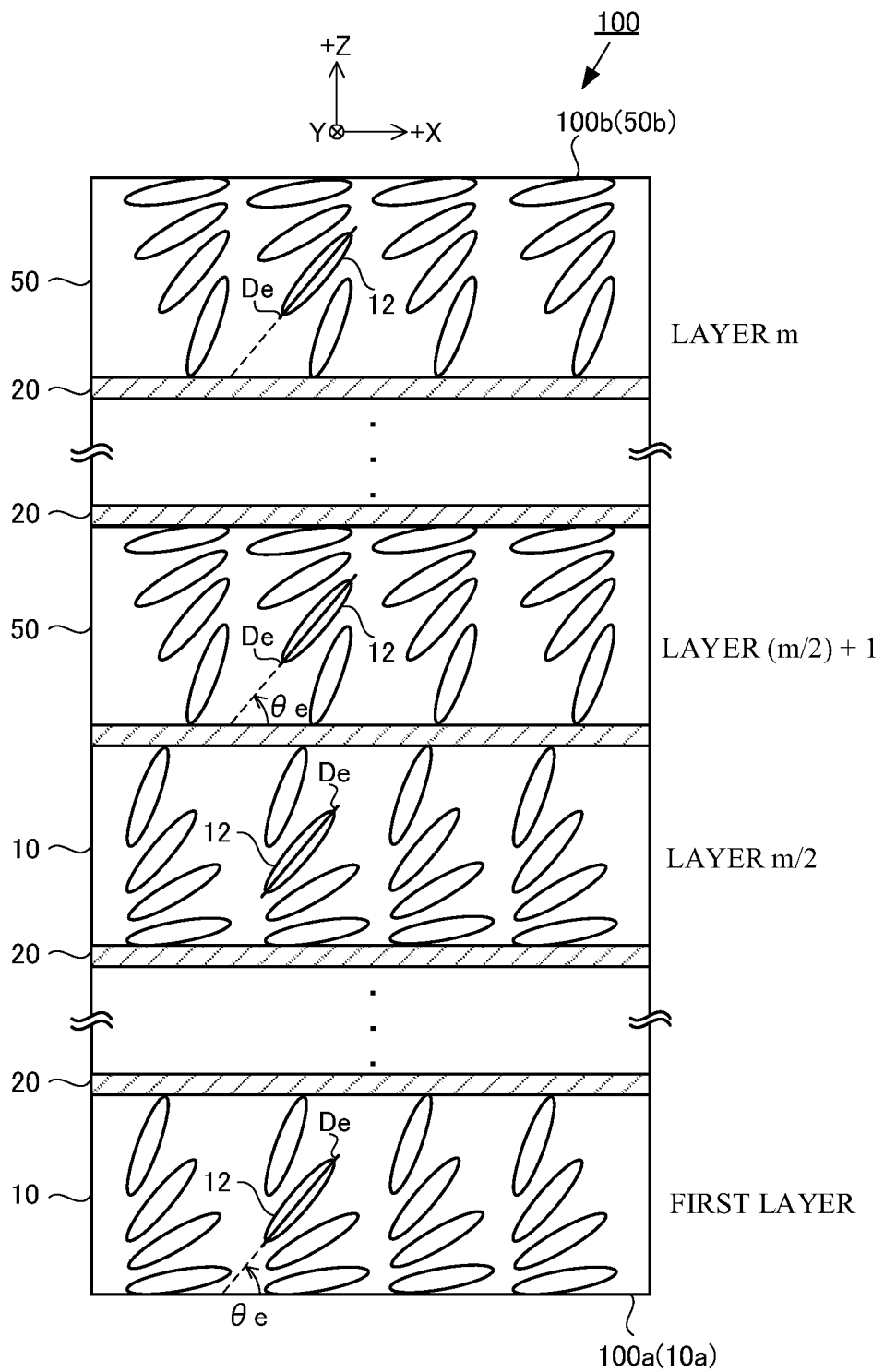
FIG. 30 is a schematic drawing illustrating a cross-section of a birefringence film according to a modified example.
Figure 31:
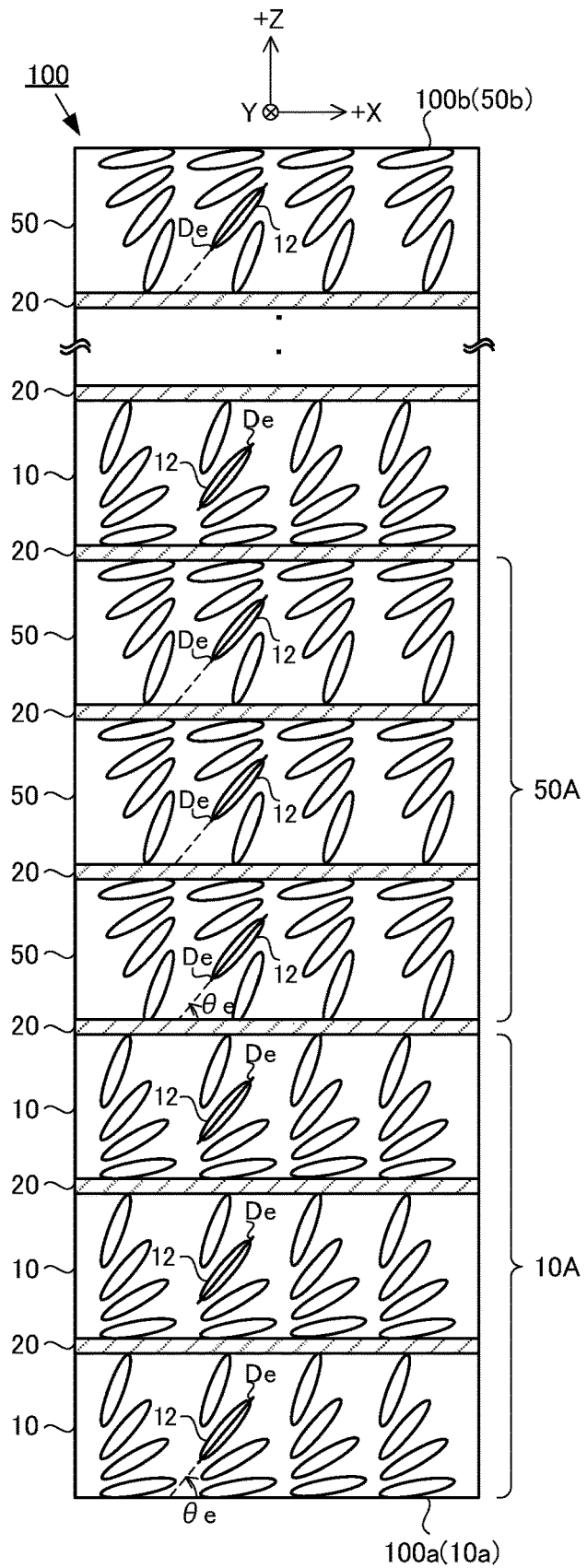
FIG. 31 is a schematic drawing illustrating a cross-section of a birefringence film according to a modified example.

In Embodiment 3, the first birefringence layer 10 and the second birefringence layer 50 are alternately stacked, but any stacking order of the first birefringence layer 10 and the second birefringence layer 50 can be implemented. For example, as illustrated in FIG. 30, a configuration is possible in which m/2 layers of the second birefringence layer 50 are stacked on m/2 layers of the first birefringence layer 10. Additionally, as illustrated in FIG. 31, a configuration is possible in which a first layer group 10A, in which a plurality of the first birefringence layer 10 is stacked, and a second layer group, 50A in which a plurality of the second birefringence layer 50 is stacked, are alternately stacked. The number of layers of the first birefringence layer 10 and the number of layers of the second birefringence layer 50 may be different.

A configuration is possible in which the polymerizable liquid crystal compound 12 that forms the first birefringence layer 10 and the polymerizable liquid crystal compound 12 that forms the second birefringence layer 50 are different.

Figure 32:
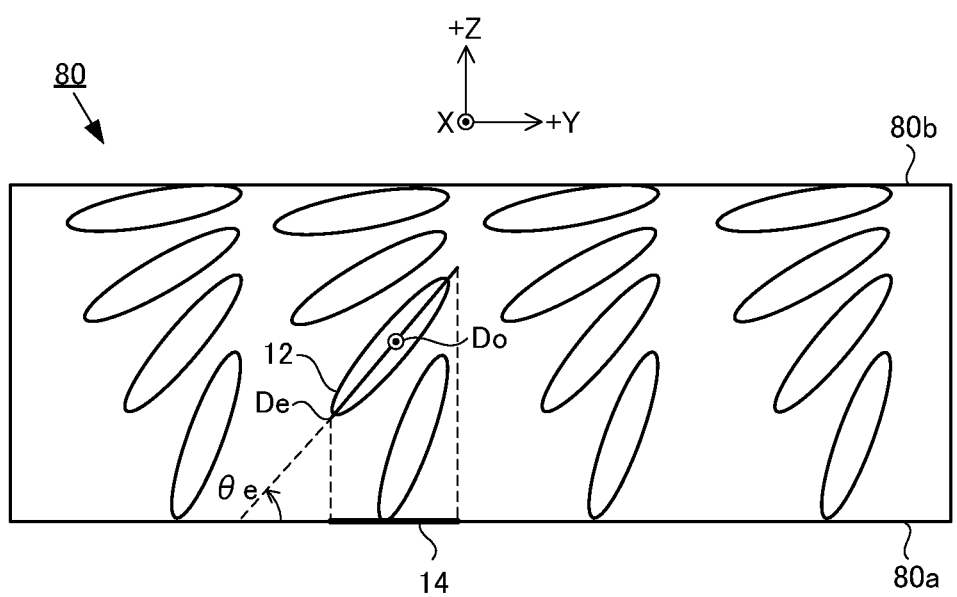
FIG. 32 is a schematic drawing illustrating a cross-section of a fourth birefringence layer according to a modified example.
Figure 33:
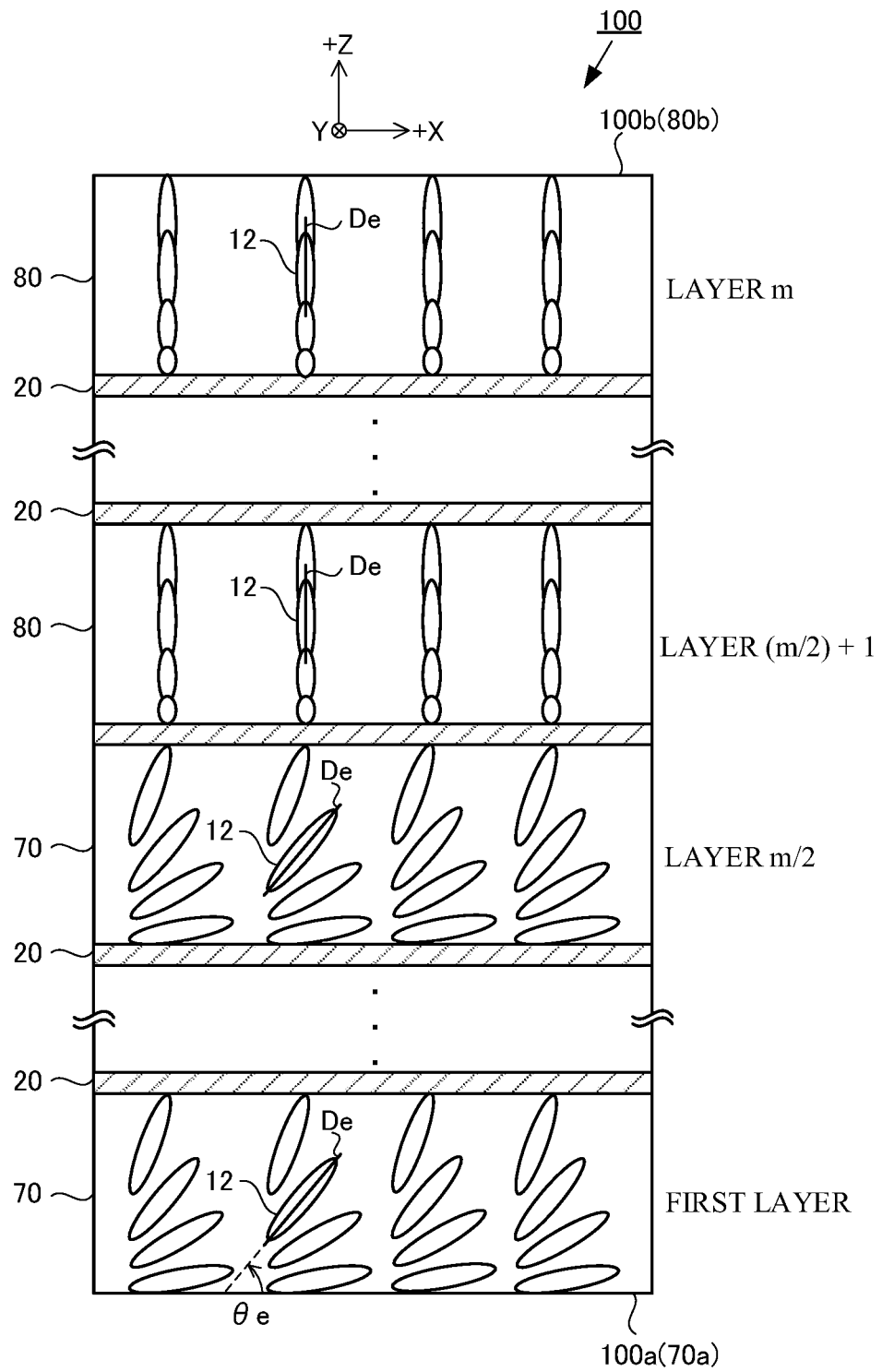
FIG. 33 is a schematic drawing illustrating a cross-section of a birefringence film according to a modified example.

In Embodiment 4, the tilt angle θe of the liquid crystalline polymer of the fourth birefringence layer 80 increases continuously from the first main surface 80a toward the second main surface 80b. As illustrated in FIG. 32, a configuration is possible in which the tilt angle θe of the liquid crystalline polymer of the fourth birefringence layer 80 decreases continuously from the first main surface 80a toward the second main surface 80b. Additionally, any stacking order may be used for the third birefringence layer 70 and the fourth birefringence layer 80. For example, as illustrated in FIG. 33, a configuration is possible in which m/2 layers of the third birefringence layer 70 are stacked on m/2 layers of the fourth birefringence layer 80. Furthermore, the number of layers of the third birefringence layer 70 and the number of layers of the fourth birefringence layer 80 may be different. For example, when the birefringence film 100 is formed from the third birefringence layer 70 for which the number of layers is m1 and the fourth birefringence layer 80 for which the number of layers is m2 (where m1 and m2 are natural numbers of 1 or greater), the birefringence film 100 can shift the exit positions of the linearly polarized light PL1 and the linearly polarized light PL2 from the second main surface 100b an amount corresponding to a distance L4 expressed by Equation (7) below.

$$L4 = \sqrt{(m1 \times D \times \tan\beta)^2 + (m2 \times D \times \tan\beta)^2} \qquad (7)$$

A configuration is possible in which the polymerizable liquid crystal compound 12 that forms the third birefringence layer 70 and the polymerizable liquid crystal compound 12 that forms the fourth birefringence layer 80 are different.

Figure 34:
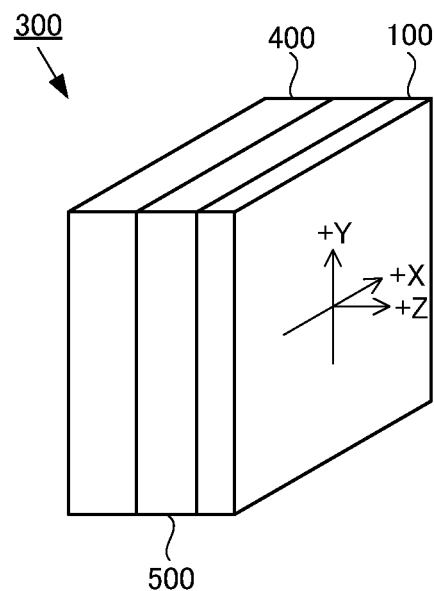
FIG. 34 is a schematic drawing illustrating a display device according to a modified example.
Figure 35:
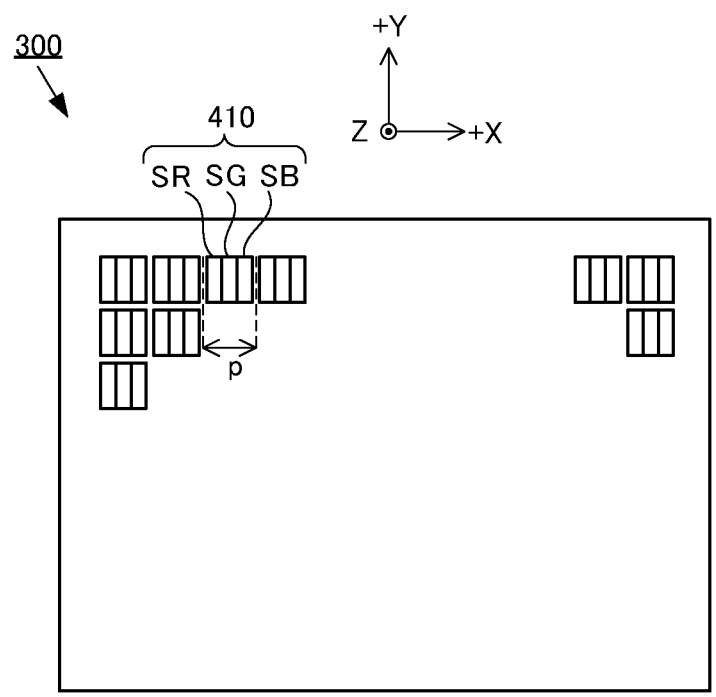
FIG. 35 is a plan view illustrating the display panel according to a modified example.
Figure 36:
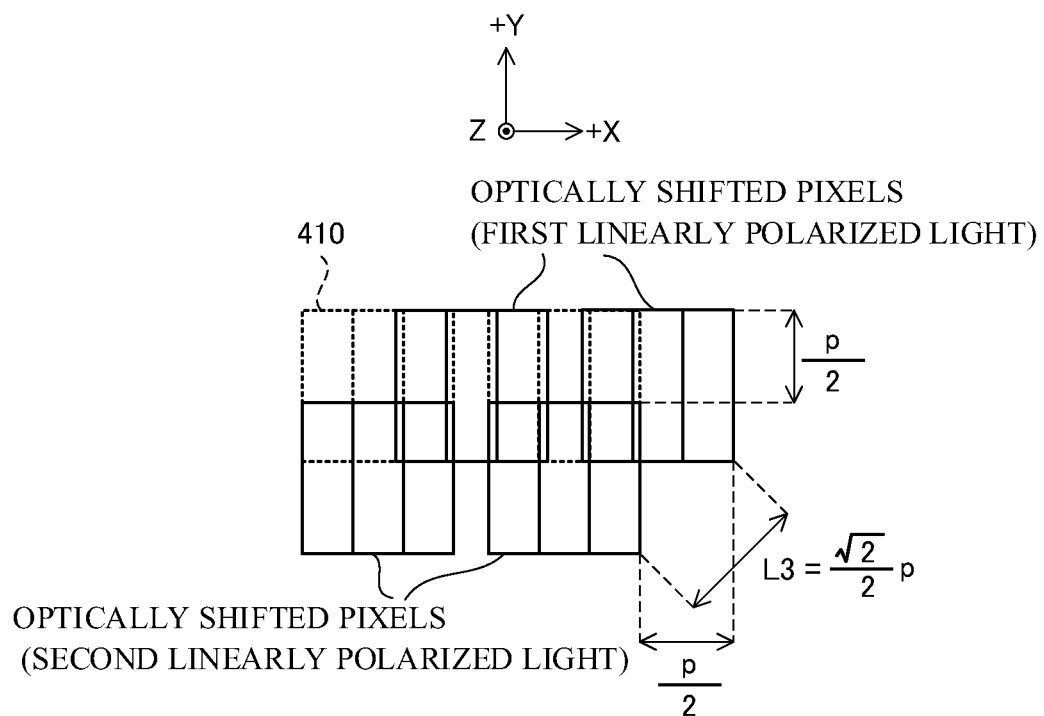
FIG. 36 is a schematic drawing illustrating optically shifted pixels according to a modified example.

A configuration is possible in which, instead of the birefringence film 100 of Embodiment 1, the display device 300 includes the birefringence film 100 of Embodiments 2 to 4. For example, as illustrated in FIG. 34, a configuration is possible in which the display device 300 includes the display panel 400, the polarization switching element 500, and the birefringence film 100 of Embodiment 4. In such a case, the plurality of pixels 410 of the display panel 400 is arranged in the X direction and the Y direction, as illustrated in FIG. 35. Additionally, the X direction corresponds to the left-right direction of the observer, and the Y direction corresponds to the up-down direction of the observer. As illustrated in FIG. 36, in a case in which the light that enters the birefringence film 100 from the polarization switching element 500 is the first linearly polarized light and in a case in which the light that enters the birefringence film 100 from the polarization switching element 500 is the second linearly polarized light, it is sufficient that the distance L3 and the pixel pitch p of the display panel 400 satisfy Equation (8) below in order to optically shift the position of the pixels 410 an amount corresponding to p/2 in the left-right direction of the observer and the amount corresponding to p/2 in the up-down direction of the observer.

$$L3 = \frac{\sqrt{2}}{2} \times p \qquad (8)$$

When the display device 300 includes the birefringence film 100 of Embodiment 2 or Embodiment 3, the display panel 400, the polarization switching element 500, and the birefringence film 100 of Embodiment 2 or Embodiment 3 are arranged the same as in Embodiment 5. Additionally, in a case in which the light that enters the birefringence film 100 from the polarization switching element 500 is the first linearly polarized light and in a case in which the light that enters the birefringence film 100 from the polarization switching element 500 is the second linearly polarized light, it is sufficient that, as in Embodiment 5, Equation (6) below is satisfied in order to optically shift the position of the pixels 410 the amount corresponding to p/2 in the left-right direction of the observer (the 45° direction equally bisecting the X direction and the Y direction) and the amount corresponding to p/2 in the up-down direction of the observer (the direction orthogonal to the 45° direction equally bisecting the X direction and the Y direction).

A configuration is possible in which the display panel 400 of the display device 300 is implemented as an organic electro-luminescence (EL) display panel. Note that, when the display panel 400 is implemented as an organic EL display panel, the polarization switching element 500 includes a polarizing plate on the display panel 400 side.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A birefringence film, comprising:
   a plurality of birefringence layers including a hybrid-aligned liquid crystalline polymer,
   wherein the plurality of birefringence layers is stacked in a state in which alignment directions of the liquid crystal polymer are identical, and rising directions of a tilt angle of the liquid crystal polymer are identical, and
   wherein an exit position of extraordinary light, from light which entered the birefringence film, is shifted from an exit position of ordinary light from the light which entered the birefringence film.

2. The birefringence film according to claim 1, further comprising:
   a protection layer between the birefringence layers.

3. The birefringence film according to claim 1, wherein the plurality of birefringence layers includes a first birefringence layer in which a tilt angle of the liquid crystalline polymer continuously increases, and a second birefringence layer in which the tilt angle of the liquid crystalline polymer continuously decreases.

4. The birefringence film according to claim 3, wherein the first birefringence layer and the second birefringence layer are alternately stacked in a state in which tilt directions of the tilt angle of the liquid crystalline polymer are identical.

5. A display device, comprising:
the birefringence film according to claim 1;
a display panel including an arranged plurality of pixels, the birefringence film being disposed on a display surface side of the display panel; and
a polarization switching element that is disposed between the display panel and the birefringence film, that switches light exiting from the display panel between first linearly polarized light, for which a polarization direction is a predetermined third direction, and second linearly polarized light, for which the polarization direction is orthogonal to the polarization direction of the first linearly polarized light, and emits the light on the birefringence film, wherein
the polarization switching element emits one of the first linearly polarized light and the second linearly polarized light on the birefringence film as ordinary light and emits another of the first linearly polarized light and the second linearly polarized light on the birefringence film as extraordinary light.

6. The display device according to claim 5, wherein the pixels include a plurality of subpixels that emit light of different colors, and
wherein, if p is a pitch of the pixels, ne is an extraordinary light refractive index of the liquid crystalline polymer, no is an ordinary light refractive index of the liquid crystalline polymer, $\theta$ is an average value of tilt angles of the liquid crystalline polymer, D is a thickness of a birefringence layer included in the birefringence film, m is a number of layers of the birefringence layer included in the birefringence film, L1 is a distance from an entrance position, $\beta$ is a refraction angle of the extraordinary light, and $\alpha$ is an angle of an extraordinary light axis of the birefringence layer, $$L1 = \frac{\sqrt{2}}{2} \times p \tag{1}$$

$$L1 = m \times D \times \tan\beta \tag{2}$$

$$\tan\beta = \frac{(ne^2 - no^2) \times \sin\alpha \times \cos\alpha}{ne^2 \times \cos^2\alpha + no^2 \times \sin^2\alpha} \tag{3}$$

and $$\alpha = 90 - \theta \tag{4}$$

are satisfied.

* * * * *